US012169999B2

(12) United States Patent
Lyons

(10) Patent No.: US 12,169,999 B2
(45) Date of Patent: Dec. 17, 2024

(54) CHIP TRACKING SYSTEM

(71) Applicant: LNW Gaming, Inc., Las Vegas, NV (US)

(72) Inventor: Martin S. Lyons, Henderson, NV (US)

(73) Assignee: LNW Gaming, Inc., Las Vegas, NV (US)

(*) Notice: Subject to any disclaimer, the term of this patent is extended or adjusted under 35 U.S.C. 154(b) by 51 days.

(21) Appl. No.: 17/901,152

(22) Filed: Sep. 1, 2022

(65) Prior Publication Data

US 2023/0075651 A1 Mar. 9, 2023

Related U.S. Application Data

(60) Provisional application No. 63/240,171, filed on Sep. 2, 2021.

(51) Int. Cl.
*G07F 17/32* (2006.01)

(52) U.S. Cl.
CPC ........ *G07F 17/322* (2013.01); *G07F 17/3239* (2013.01)

(58) Field of Classification Search
CPC ..................................................... G07F 17/322
See application file for complete search history.

(56) References Cited

U.S. PATENT DOCUMENTS 5,103,081 A 4/1992 Fisher et al.
5,451,054 A 9/1995 Orenstein
5,757,876 A 5/1998 Dam et al.
6,460,848 B1 10/2002 Soltys et al.
6,514,140 B1 2/2003 Storch
6,517,435 B2 2/2003 Soltys et al.
6,517,436 B2 2/2003 Soltys et al.
(Continued)

FOREIGN PATENT DOCUMENTS

WO 2017197452 A1 11/2017
WO 2018047965 A1 3/2018
(Continued)

OTHER PUBLICATIONS

US 10,380,841 B2, 08/2019, Shigeta (withdrawn)

*Primary Examiner* — Jasson H Yoo

(57) ABSTRACT

According to one aspect of the present disclosure, a gaming system is provided for tracking chips in a gaming environment. In some embodiments, an apparatus, system, etc. comprises a chip tray having one or more image sensors. The apparatus further comprises a tracking controller. The chip tray includes columns. The image sensor(s) are positioned between a least two of the columns and aligned substantially parallel to a vertical height of the columns. The tracking controller is configured, in some embodiments, to perform operations that cause the apparatus to capture, via the one or more image sensors, image data of a chip stack in at least one of the two of the columns. The tracking controller is further configured to segment the chip stack from the image data, and detect, via a machine learning model, a value of each chip in the chip stack in response analysis of chip-edge features of each gaming chip in the chip stack. The tracking controller is further configured to electronically present information associated with detection of the value of each gaming chip in the chip stack.

20 Claims, 9 Drawing Sheets

(56) References Cited

U.S. PATENT DOCUMENTS

| | | | |
|---|---|---|---|
| 6,520,857 | B2 | 2/2003 | Soltys et al. |
| 6,527,271 | B2 | 3/2003 | Soltys et al. |
| 6,530,836 | B2 | 3/2003 | Soltys et al. |
| 6,530,837 | B2 | 3/2003 | Soltys et al. |
| 6,533,662 | B2 | 3/2003 | Soltys et al. |
| 6,579,180 | B2 | 6/2003 | Soltys et al. |
| 6,579,181 | B2 | 6/2003 | Soltys et al. |
| 6,663,490 | B2 | 12/2003 | Soltys et al. |
| 6,688,979 | B2 | 2/2004 | Soltys et al. |
| 6,712,696 | B2 | 3/2004 | Soltys et al. |
| 6,758,751 | B2 | 7/2004 | Soltys et al. |
| 7,124,947 | B2 | 10/2006 | Storch |
| 7,316,615 | B2 | 1/2008 | Soltys et al. |
| 7,753,781 | B2 | 7/2010 | Storch |
| 7,771,272 | B2 | 8/2010 | Soltys et al. |
| 8,130,097 | B2 | 3/2012 | Knust et al. |
| 8,285,034 | B2 | 10/2012 | Rajaraman et al. |
| 8,606,002 | B2 | 12/2013 | Rajaraman et al. |
| 9,378,605 | B2 | 6/2016 | Koyama |
| 9,795,870 | B2 | 10/2017 | Ratliff |
| 10,032,335 | B2 | 7/2018 | Shigeta |
| 10,096,206 | B2 | 10/2018 | Bulzacki et al. |
| 10,192,085 | B2 | 1/2019 | Shigeta |
| 10,398,202 | B2 | 9/2019 | Shigeta |
| 10,403,090 | B2 | 9/2019 | Shigeta |
| 10,529,183 | B2 | 1/2020 | Shigeta |
| 10,540,846 | B2 | 1/2020 | Shigeta |
| 10,580,254 | B2 | 3/2020 | Shigeta |
| 10,593,154 | B2 | 3/2020 | Shigeta |
| 10,600,279 | B2 | 3/2020 | Shigeta |
| 10,600,282 | B2 | 3/2020 | Shigeta |
| 10,665,054 | B2 | 5/2020 | Shigeta |
| 2002/0042298 | A1 | 4/2002 | Soltys et al. |
| 2005/0059479 | A1 | 3/2005 | Soltys et al. |
| 2006/0019739 | A1 | 1/2006 | Soltys et al. |
| 2014/0357361 | A1* | 12/2014 | Rajaraman ............ G07F 17/323 463/31 |
| 2018/0061178 | A1 | 3/2018 | Shigeta |
| 2018/0068525 | A1 | 3/2018 | Shigeta |
| 2018/0075698 | A1 | 3/2018 | Shigeta |
| 2018/0114406 | A1 | 4/2018 | Shigeta |
| 2018/0211110 | A1 | 7/2018 | Shigeta |
| 2018/0239984 | A1 | 8/2018 | Shigeta |
| 2018/0247134 | A1 | 8/2018 | Bulzacki et al. |
| 2018/0336757 | A1 | 11/2018 | Shigeta |
| 2018/0350191 | A1 | 12/2018 | Shigeta |
| 2019/0043309 | A1 | 2/2019 | Shigeta |
| 2019/0088082 | A1 | 3/2019 | Shigeta |
| 2019/0102987 | A1 | 4/2019 | Shigeta |
| 2019/0108710 | A1 | 4/2019 | French et al. |
| 2019/0147689 | A1 | 5/2019 | Shigeta |
| 2019/0172312 | A1 | 6/2019 | Shigeta |
| 2019/0213830 | A1 | 7/2019 | Main, Jr. |
| 2019/0236891 | A1 | 8/2019 | Shigeta |
| 2019/0259238 | A1 | 8/2019 | Shigeta |
| 2019/0266832 | A1 | 8/2019 | Shigeta |
| 2019/0347893 | A1 | 11/2019 | Shigeta |
| 2019/0362594 | A1 | 11/2019 | Shigeta |
| 2019/0371112 | A1 | 12/2019 | Shigeta |
| 2021/0248871 | A1* | 8/2021 | Gelinotte .............. G07F 17/322 |
| 2023/0032920 | A1* | 2/2023 | Bulzacki ................. G01S 17/04 |

FOREIGN PATENT DOCUMENTS

| | | | | |
|---|---|---|---|---|
| WO | 2020068141 | A1 | 4/2020 | |
| WO | WO-2021072540 | A1 * | 4/2021 | ............... G06K 9/20 |

* cited by examiner (VIEW FROM EMBEDDED IMAGE SENSOR CENTERED BETWEEN TWO CHIP STACKS OF ADJACENT CHIP-TRAY COLUMNS)

(VIEW FROM ANGLED EMBEDDED IMAGE SENSOR BETWEEN TWO CHIP STACKS OF ADJACENT CHIP-TRAY COLUMNS)

CHIP TRACKING SYSTEM

CROSS-REFERENCE TO RELATED APPLICATIONS

This application claims the priority benefit of U.S. Provisional Patent Application No. 63/240,171 filed Sep. 2, 2021, which 63/240,171 application is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022 LNW Gaming, Inc.

FIELD OF THE INVENTION

The present invention relates generally to gaming systems, apparatus, and methods and, more particularly, to image analysis and tracking of physical objects in a gaming environment.

BACKGROUND

Casino gaming environments are dynamic environments in which people, such as players, casino patrons, casino staff, etc., take actions that affect the state of the gaming environment, the state of players, etc. For example, a player may use one or more physical tokens to place wagers on the wagering game. A player may perform hand gestures to perform gaming actions and/or to communicate instructions during a game, such as making gestures to hit, stand, fold, etc. Further, a player may move physical cards, dice, gaming props, etc. A multitude of other actions and events may occur at any given time. To effectively manage such a dynamic environment, the casino operators may employ one or more tracking systems or techniques to monitor aspects of the casino gaming environment, such as credit balance, player account information, player movements, game play events, and the like.

Some gaming systems can perform object tracking in a gaming environment. For example, a gaming system with a camera at a gaming table can capture an image feed of a gaming area to identify certain physical objects or to detect certain activities such as betting actions, payouts, player actions, etc. However, one challenge to such a gaming system is tracking the complexity of the system elements, particularly regarding the tracking of money. For example, a camera near a gaming table may take pictures of casino tokens (e.g., gaming chips) at the gaming table. However, gaming chips are relatively thin (e.g., ~3 mm thick) and can be stacked close together on a chip stack within a chip tray. Because of the relatively small size of chips, the detail in the images (taken from the camera near the gaming table) may be insufficient for an automated-analysis model (e.g. machine learning model) to distinguish chip-edge features, or other finely detailed chip characteristics, that indicate chip values. As a result, contemporary computer vision systems fail to identify some chips, resulting in lost revenue for a casino when a dealer misplaces a high-value chip into a wrong stack of chips in a chip tray and accidentally delivers the misplaced, high-value chip to a player when a lower-value chip was intended.

Accordingly, a new tracking system that is adaptable to the challenges of dynamic casino gaming environments is desired.

SUMMARY

According to one aspect of the present disclosure, a gaming system is provided for tracking chips in a gaming environment. In some embodiments, an apparatus comprises a chip tray having one or more image sensors. The apparatus further comprises a tracking controller. The chip tray includes columns. The image sensor(s) are positioned between a least two of the columns and aligned substantially parallel to a vertical height of the columns. The tracking controller is configured, in some embodiments, to perform operations that cause the apparatus to capture, via the one or more image sensors, image data of a chip stack in at least one of the two of the columns. The tracking controller is further configured to segment the chip stack from the image data, and detect, via a machine learning model, a value of each chip in the chip stack in response analysis of chip-edge features of each gaming chip in the chip stack. The tracking controller is further configured to electronically present information associated with detection of the value of each gaming chip in the chip stack.

Additional aspects of the invention will be apparent to those of ordinary skill in the art in view of the detailed description of various embodiments, which is made with reference to the drawings, a brief description of which is provided below.

Figure 1:
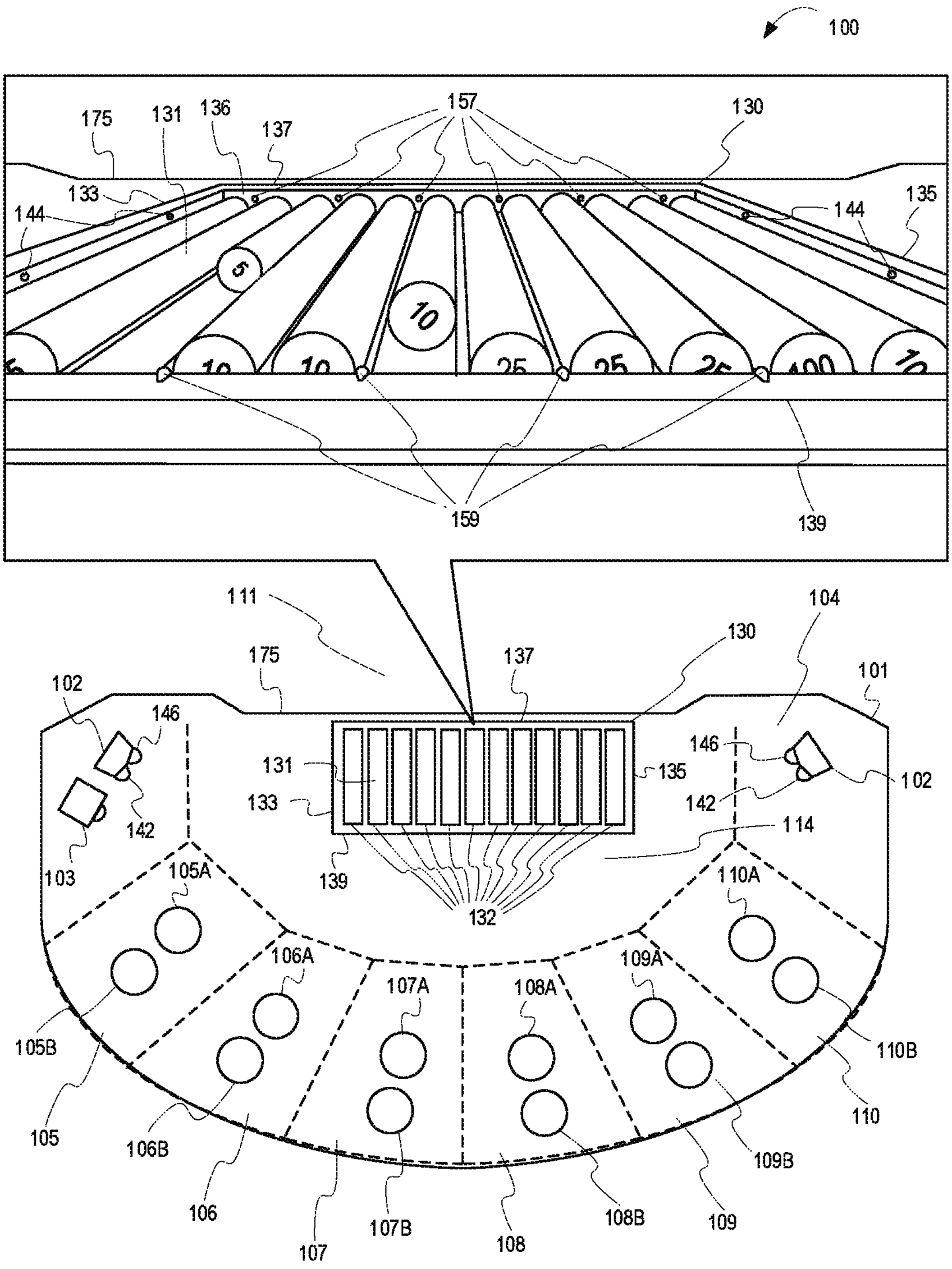
FIG. 1 is a diagram of an example gaming system according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words “and” and “or” shall be both conjunctive and disjunctive; the word “all” means “any and all”; the word “any” means “any and all”; and the word “including” means “including without limitation.”

For purposes of the present detailed description, the terms “wagering game,” “casino wagering game,” “gambling,” “slot game,” “casino game,” and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

FIG. 1 is a diagram of an example gaming system 100 according to one or more embodiments of the present disclosure. The gaming system 100 includes a gaming table 101 and an image-sensing chip tray (chip tray 130). The chip tray 130 can hold gaming tokens, such as gaming chips (“chips 131”) which form the chip stacks within one or more vertical, semi-cylindrical slots or columns (e.g., column 132) after being placed there (e.g., by a dealer). The dealer can use the chips 131 to exchange a player’s money for physical gaming tokens and to track an amount of money transacted during game play. As shown in FIG. 1, the chip tray 130 is positioned at a location of the gaming table 101 related to a dealer (i.e., at a dealer area 111). The dealer area 111 is the location at which a dealer would be stationed during game play (dealer not shown in FIG. 1 for simplicity of illustration). The chip tray 130 rests upon a surface 104 of the gaming table 101 and/or in a recessed portion of the surface 104 near a back edge 175 of the gaming table 101 associated with the dealer area 111.

In some embodiments, the chip tray 130 includes images sensors (e.g., image sensors 157, image sensors 159, image sensors 144, etc.). The image sensors are positioned between chip-tray columns (columns 132) and are aligned substantially parallel to a vertical height of the columns 132. In some instances the image sensors are embedded into the structure (e.g., the material) of the chip tray 130 to ensure they remain set to a viewing perspective of at least the portion of the edges of the chips 131 in chip stacks on the chip tray 130. For example, image sensors 157 are positioned in an array at the bottom of the chip tray 130 between specific ones of the columns 132 (e.g., each one of the image sensors 157 are positioned between specific pairs of columns). The image sensors 157 face upward from a bottom part of the chip tray 130. For example, the chip tray 130 is sloped such that when a stack of the chips 131 rests within any one of the given columns 132, gravity pulls the chip stack downward to rest upon a bottom resting plate 136 near a bottom edge 137 of the chip tray 130. The image sensors 157 capture images of the chips 131 in any two columns 132 that are adjacent to an individual one of the image sensors 157. In some embodiments, image sensors 159 are positioned near a top edge 139 of the chip tray 130.

The image sensors 157 and image sensors 159 have opposite or opposing viewing perspectives to each other. In some embodiments, image sensors 144 are positioned at left and right sides (i.e., side 133 and side 135) of the chip tray 130. In some embodiments, the sensors 144 have opposite or opposing viewing perspectives to each other. The term “viewing perspective” is referred to more succinctly herein as a “viewpoint.” Thus opposite or opposing viewing perspectives are referred to herein as “opposing viewpoints.” Image sensors with opposing viewpoints are referred to herein as “opposing-viewpoint” image sensors. Data captured or collected by image sensors that have opposing viewpoints is referred to as “opposing-viewpoint data”. The opposing viewpoint data (taken from opposing-viewpoint image sensors) has an inverse symmetrical relationship regarding where each pixel in the respective images relates to a given chip position in the chip tray 130. Further, in some embodiments the image sensors 157, image sensors 159 and/or image sensors 144 are fixed, or can be automatically locked into known fixed positions with known viewing perspectives relative to each other. Thus, in some embodiments, a processor of the gaming system 100 (e.g., tracking controller 204 shown in FIG. 2), can utilize independent instances of computer visioning models to detect both of the opposing viewpoints from the independently captured image stream data of the opposing-viewpoint image sensors. The tracking controller 204 then compares and/or combines the analysis of the opposing viewpoints to accurately identify and/or verify chip denomination values.

In some embodiments, the image sensors 157 are spaced between every other pair of columns 132. For example, as shown in FIG. 1, the chip tray 130 includes twelve columns, yet only requires six of the image sensors 157 because the image sensors 157 are spaced to capture only one side of each chip stack in the columns 132. Given that the chips 131 in any given chip stack have uniform edge features around the chip stack, the image sensors 157 only need to capture an image of one side of any given chip stack in order to analyze and detect the chip values for the chip stack. Further, given that any one of the image sensors 157 is positioned between two adjacent columns such that it can capture an image of both chip-stacks in a single image, the system 100 (e.g., tracking controller 204 in FIG. 2) can segment the image data into portions, such as left and right halves, each half representing the different adjacent chip stacks (e.g., see FIG. 7A). In addition, the tracking controller 204 can, via an automated, computerized visioning model (e.g., a computer vision model, a machine learning model, etc.), analyze both of the chip stacks (in each of the segmented left-half image and the segmented right-half image), detect the chip edge patterns separately for each of the two chip stacks, and classify individual chips according to chip denomination values.

Figure 3:
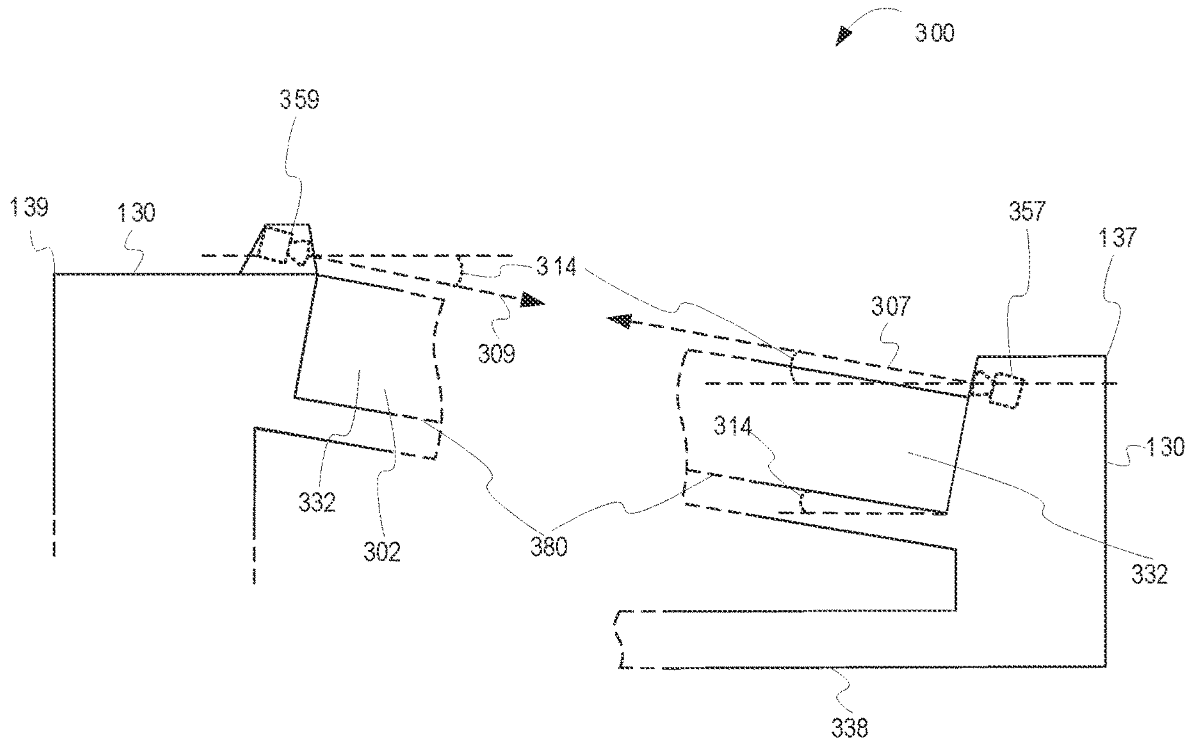
FIG. 3 is a diagram of an exemplary system according to one or more embodiments of the present disclosure.

In some embodiments, as mentioned, the tracking controller 204 utilizes opposing-viewpoint image sensors (e.g., image sensors 157 and image sensors 159 or image sensors 144). For instance, the opposing-viewpoint image sensors 157 and image sensors 159 are respectively positioned on opposite ends of any one of the columns 132. FIG. 3 is a diagram of an exemplary system 300 with embedded, opposing-viewpoint image sensors according to one or more embodiments of the present disclosure. In the example illustrated in FIG. 3, a gaming system 300 includes the chip tray 130 and embedded image sensors (e.g., image sensor 359 and image sensor 357). FIG. 3 illustrates a cut-away view of the chip tray 130 showing an interior portion 302 of one of the columns 132 (referred to in FIG. 3 as "column 332"). The image sensor 359 and the image sensor 357 are aligned substantially parallel to the vertical height of the column 332, thus are oriented in the chip tray 130 to be aligned with the slope of the column (e.g., aligned with the slope of a lower wall 380 of the column 332). The image sensor 359 is positioned at a top portion of the chip tray 130 (e.g., near the top edge 139) while image sensor 357 is positioned at a bottom portion of the chip tray 130 (e.g., near the bottom edge 137). In some embodiments, the image sensor 359 directly faces the image sensor 357. The image sensor 357 and image sensor 359 are illustrated as embedded into the material of the chip tray 130, with an opening in the material for the light-capturing sensor (and/or accompanying lens) to visually capture images along a viewing perspective or viewing angle. For example, the image sensor 357 has a viewing perspective 307 that faces upward along the slope of the direction of the column 332 (e.g., the viewing perspective is substantially parallel to the lower wall 380). On the other hand, the image sensor 359 is angled downward from the top of the column 332, with a viewing perspective 309 that also follows the slope of the direction of the column 332, however, the viewing perspective 309 opposes (i.e., is facing the opposite direction as) the viewing perspective 307 of the corresponding image sensor 357 at the opposite side of the chip tray 130. An angle 314 at which the image sensor 359 and image sensor 357 are positioned is relative to an angle between the bottom wall 380 and a horizontal plane of a base 338 of the chip tray 130, which base 338 rests upon the gaming table 101 (e.g., upon the surface 104 of the gaming table 101 and/or in a recessed portion of the surface 104).

In some embodiments, the bottom image sensor (i.e., image sensor 357) can capture image data for the bottom halves of adjacent chip stacks while a top image sensor (e.g., image sensor 359) can capture image data for the top halves of adjacent chip stacks. The system 100 (e.g., tracking controller 204) can further segment the chip stacks into two different images representing the top halves and lower halves of the chip stacks, where each segmented portion has a greater resolution of the chips within the respective image half than if only one image had been taken for the chip stacks.

A controller (e.g., tracking controller 204 in FIG. 2) is configured to electronically analyze the images taken by the image sensors 157 and/or image sensors 159, such as via a machine learning model (e.g., via feature set extraction, object classification, etc. of a neural network model). For instance, a neural network model is trained to identify chips as objects and classify the chips according to denomation value based on observation of the colors, patterns, etc. on the edges of the chips from the viewing perspective(s) of the image sensors 157 and/or image sensors 159.

In some embodiments, the tracking controller 204 is also configured to automatically detect physical objects in a gaming environment as points of interest based on electronic analysis of an image performed by one or more additional neural network models. In some embodiments, the tracking controller 204 can access, control, or otherwise use one or more environmental image sensors (e.g., camera(s) 102) and a projector 103. In some embodiments, the camera(s) 102 are separate from the chip tray 130. The camera(s) 102 can capture one or more streams of images of a gaming area. For example, first image sensor(s) 142 capture first streams of images of first portions of the gaming area, such as portions of the top surface 104 relevant to game play. The first image sensor(s) 142 also capture image data related to game participants (e.g., players, back-betting patrons, dealer, etc.) positioned around the gaming table 101 (at the different player areas 105, 106, 107, 108, 109, and 110 and/or at the dealer area 111). Second image sensor(s) 146 capture image data related to dealer area 111 and/or the chip tray 130. The camera(s) 102 are positioned above the surface 104 and to the left and right sides of the dealer area 111. In some embodiments, the viewing perspectives of the image sensor(s) 144 are substantially orthogonal to the vertical height of the columns 132. Furthermore, in some embodiments, the image sensor(s) 146 have opposing viewpoints from each other. Thus, each can capture opposing-viewpoint image data from either side of the chip tray 130. The opposing-viewpoint image data can be used to more accurately detect the identity of the chips 131. For example, one of the image sensor(s) 146 captures image data of one of the columns 132 from a left side while the other of the image sensor(s) 146 captures image data of the same one of the columns 132 from a right side. The tracking controller 204 can determine, from these opposing viewpoints, the left and right sides of any chip stacks. Thus a first instance of a machine learning model can (using the stream of images from the first one of the image sensor(s) 146) detect a chip edge pattern of one or more chips from one side of the chip stack. Simultaneously, a second instance of the machine learning model can (using the stream of images from the second one of the image sensor(s) 146) detect a chip edge pattern of the same one or more chips from an opposite side of the chip stack. The tracking controller 204 can further compare and/or combine the left and right side images to independently verify chip values. Images from fixed, opposing viewpoints are symmetrical inverses of each other, thus the relative geometric positions of each chip (from each opposing viewpoint) can be aligned to the other by an inverse transformation function. The coordinates of each chip (from the opposing viewpoints), thus can be pinpointed by the two instances of the machine learning models using the symmetrical inverse relationship. The independent instances of the machine learning models thus obtain independent verification (via independent analysis of the opposing-viewpoint image data) of any given chip value by the pinpointed locations. In some embodiments, the image sensor(s) 146 are used in place of, or in addition to, the image sensors 144.

In some embodiments, the tracking controller 204 activates and deactivates the image sensor(s) 146, image sensors 157, image sensors 159, and/or image sensors 144 automatically based on a position of participants, such as the dealer. For example, the tracking controller 204 detects when a dealer (or any portion of the dealer, such as a hand or arm) is blocking a view of the chips 131. The tracking controller 204 deactivates the blocked image sensor until the dealer no longer blocks the view. Then the tracking controler 204 reactivates the image sensor to continue capturing an image stream of the chip tray 130.

In some embodiments, the chips 131 are further marked with a hidden or invisible marking that the image sensors 142, image sensors 146, image sensors 157, image sensors 159, and/or image sensors 144 are configured to detect using light and/or electromagnetic frequencies outside the average human visible range. For example, in some embodiments the image sensors described herein are equipped to detect infrared signals and/or ultraviolet light reflected off of the chips 131. Thus, the tracking controller 204 (and/or any machine learning models it uses) can more accurately detect an identity of a chip and/or determine a chip value.

The projector 103 is also positioned above the gaming table 101, and also to the left of the first player area 105. The projector 103 can project images of gaming content toward the surface 104 relative to objects in the gaming area. In some instances, the projector 103 is configured to project images of gaming content relevant to some elements of a wagering game that are common, or related, to any or all participants (e.g., the projector 103 projects gaming content at a communal presentation area 114).

In some embodiments, the gaming system 100 can detect one or more points of interest by detecting, via a specific type of computer visioning model (e.g., a machine learning model or neural network model), physical features of the image that appear at the surface 104. For example, the tracking controller 204 is configured to monitor the gaming area (e.g., physical objects within the gaming area), and to determine a relationship between one or more of the objects. The tracking controller 204 can further receive and analyze collected sensor data to detect and monitor physical objects (e.g., the tracking controller 204 receives and analyzes the captured image data from image sensors 157, image sensors 159, and or from one or more image sensors either on or external to the chip tray 130). The tracking controller 204 can establish data structures relating to various physical objects detected in the image data. For example, the tracking controller 204 can apply one or more image neural network models during image analysis that are trained to detect aspects of physical objects. In at least some embodiments, each model applied by the tracking controller 204 may be configured to identify a particular aspect of the image data and provide different outputs for any physical objected identified such that the tracking controller 204 may aggregate the outputs of the neural network models together to identify physical objects as described herein. The tracking controller 204 may generate data objects for each physical object identified within the captured image data. The data objects may include identifiers that uniquely identify the physical objects such that the data stored within the data objects is tied to the physical objects. The tracking controller 204 can further store data in a database, such as database system 208 in FIG. 2.

In some embodiments, the tracking controller 204 is configured to detect bank-change events, or in other words, events that occur in the gaming environment that would affect a change to the overall value of the bank of chips 131 within the chip tray 130, such as buy-ins, won bets, and pay-outs. For example, the tracking controller 204 can identify betting circles (e.g., main betting circles 105A, 106A, 107A, 108A, 109A, and 110A ("105A-110A") and secondary betting circles 105B, 106B, 107B, 108B, 109B, and 110B ("105B-110B")). The betting circles are positioned relative to player stations 105, 106, 107, 108, 109, and 110. The tracking controller 204 can also detect placement of gaming chips (e.g., as stacks) within the betting circles during betting on a wagering game conducted at the gaming table 101. The tracking controller 204 can further determine the values of chip stacks within the betting circles. The tracking controller 204 determines, based on the values of the chip stacks, amounts by which the bank is expected to change based on collection of losing bets and/or payouts required for winning bets. The tracking controller 204 can compare the expected amounts to actual changes to the chips 131 in the chip tray 130. Based on the comparison, the tracking controller 204, for instance, determines whether there are any errors in placement of chips of one denomination value into one of the columns 132 for a different denomination value. The tracking controller 204 can further generate warnings (e.g. of the errors of placement of chips in the wrong column) and/or generate reports that tracks the accuracy of a dealer's handling of the chips into and out of the bank.

Some objects may be included at the gaming table 101, such as gaming tokens, cards, a card shoe, dice, etc. but are not shown in FIG. 1 for simplicity of description.

Figure 2:
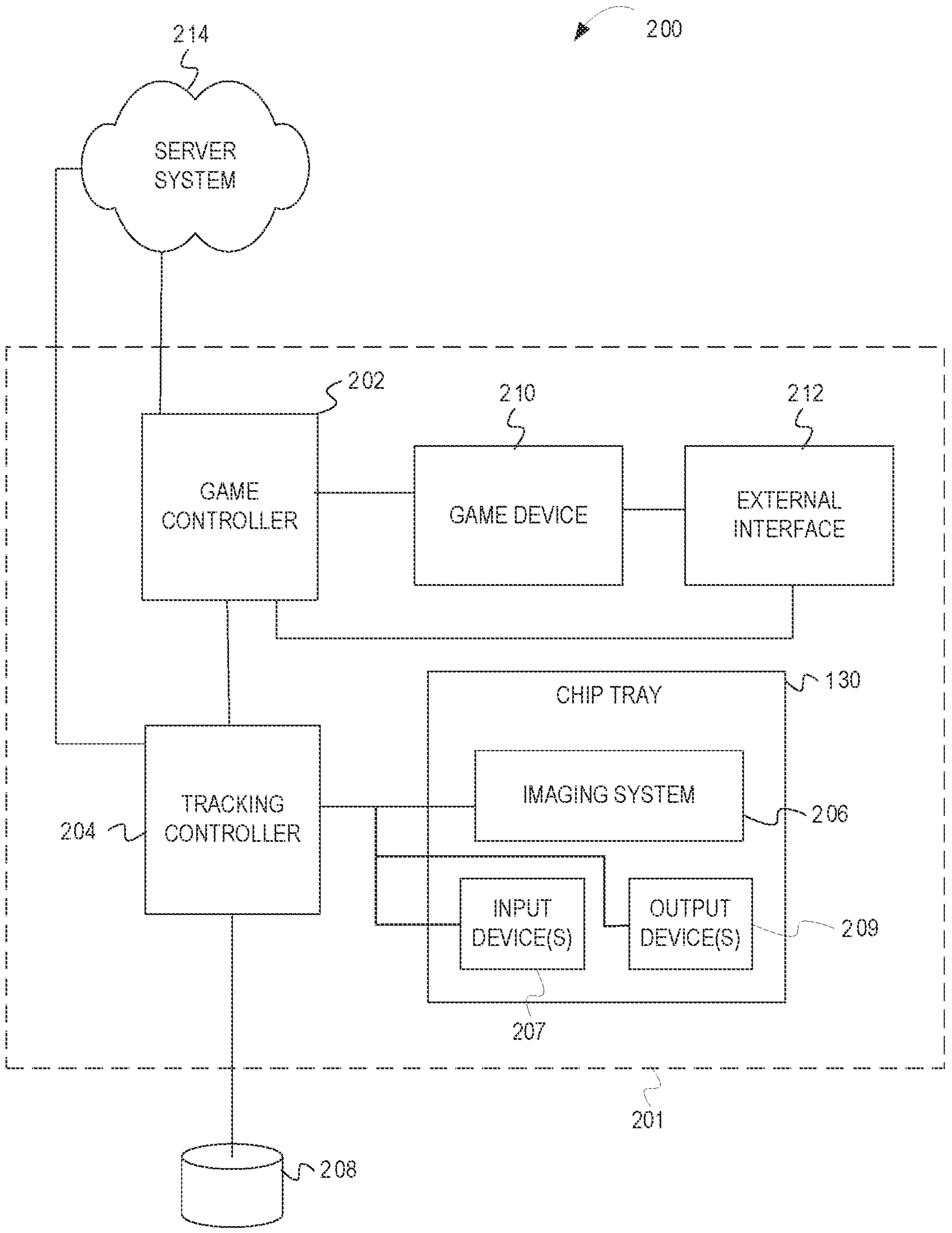
FIG. 2 is an architectural diagram of an exemplary gaming system according to one or more embodiments of the present disclosure.

FIG. 2 is a block diagram of an example gaming system 200 for tracking aspects of a wagering game in a gaming area 201. In the example embodiment, the gaming system 200 includes a game controller 202, a gaming device 210 (e.g., gaming table 101), the tracking controller 204, and an image-sensing chip tray (e.g., chip tray 130). The chip tray 130 includes an imaging system 206 (e.g., including image sensors 159 and/or 157 (see FIG. 1), image sensors 357 and/or 359 (see FIG. 3), and/or image sensors 657 and 659 (see FIG. 6)). In some embodiments, the chip tray 130 also includes one or more input device(s) 207 and one or more output device(s) 209, such as buttons or controls to configure image-sensor settings, displays to indicate sensor readings, wireless communication components, etc. Furthermore, the system 200 includes a tracking database system 208. In other embodiments, the gaming system 200 may include additional, fewer, or alternative components, including those described elsewhere herein.

The gaming area 201 is an environment in which one or more casino wagering games are provided. In the example embodiment, the gaming area 201 is a casino gaming table and the area surrounding the table 101 (e.g., as in FIG. 1). In other embodiments, other suitable gaming areas 201 may be monitored by the gaming system 200. For example, the gaming area 201 may include one or more floor-standing electronic gaming machines. In another example, multiple gaming tables may be monitored by the gaming system 200. Although the description herein may reference a gaming area (such as gaming area 201) to be a single gaming table and the area surrounding the gaming table, it is to be understood that other gaming areas 201 may be used with the gaming system 200 by employing the same, similar, and/or adapted details as described herein.

The game controller 202 is configured to facilitate, monitor, manage, and/or control gameplay of the one or more games at the gaming area 201. More specifically, the game controller 202 is communicatively coupled to at least one or more of the tracking controller 204, the imaging system 206, the tracking database system 208, a gaming device 210, an external interface 212, and/or a server system 214 to receive, generate, and transmit data relating to the games, the players, and/or the gaming area 201. The game controller 202 may include one or more processors, memory devices, and communication devices to perform the functionality described herein. More specifically, the memory devices store computer-readable instructions that, when executed by the processors, cause the game controller 202 to function as described herein, including communicating with the devices of the gaming system 200 via the communication device(s).

The game controller 202 may be physically located at the gaming area 201 as shown in FIG. 2 or remotely located from the gaming area 201. In certain embodiments, the game controller 202 may be a distributed computing system. That is, several devices may operate together to provide the functionality of the game controller 202. In such embodiments, at least some of the devices (or their functionality) described in FIG. 2 may be incorporated within the distributed game controller 202.

The gaming device 210 is configured to facilitate one or more aspects of a game. For example, for card-based games, the gaming device 210 may be a card shuffler, shoe, or other card-handling device. The external interface 212 is a device that presents information to a player, dealer, or other user and may accept user input to be provided to the game controller 202. In some embodiments, the external interface 212 may be a remote computing device in communication with the game controller 202, such as a player's mobile device. In other examples, the gaming device 210 and/or external interface 212 includes one or more projectors. The server system 214 is configured to provide one or more backend services and/or gameplay services to the game controller 202. For example, the server system 214 may include accounting services to monitor wagers, payouts, and jackpots for the gaming area 201. In another example, the server system 214 is configured to control gameplay by sending gameplay instructions or outcomes to the game controller 202. It is to be understood that the devices described above in communication with the game controller 202 are for exemplary purposes only, and that additional, fewer, or alternative devices may communicate with the game controller 202, including those described elsewhere herein.

In the example embodiment, the tracking controller 204 is in communication with the game controller 202. In other embodiments, the tracking controller 204 is integrated with the game controller 202 such that the game controller 202 provides the functionality of the tracking controller 204 as described herein. Like the game controller 202, the tracking controller 204 may be a single device or a distributed computing system. In one example, the tracking controller 204 may be at least partially located remotely from the gaming area 201. That is, the tracking controller 204 may receive data from one or more devices located at the gaming area 201 (e.g., the game controller 202 and/or the imaging system 206), analyze the received data, and/or transmit data back based on the analysis.

In the example embodiment, the tracking controller 204, similar to the example game controller 202, includes one or more processors, a memory device, and at least one communication device. The memory device is configured to store computer-executable instructions that, when executed by the processor(s), cause the tracking controller 204 to perform the functionality of the tracking controller 204 described herein. The communication device is configured to communicate with external devices and systems using any suitable communication protocols to enable the tracking controller 204 to interact with the external devices and integrates the functionality of the tracking controller 204 with the functionality of the external devices. The tracking controller 204 may include several communication devices to facilitate communication with a variety of external devices using different communication protocols.

The tracking controller 204 is configured to monitor at least one or more aspects of the gaming area 201. In the example embodiment, the tracking controller 204 is configured to monitor physical objects within the area 201, and determine a relationship between one or more of the objects. Some objects may include gaming tokens. The tokens may be any physical object (or set of physical objects) used to place wagers. As used herein, the term "stack" refers to one or more gaming tokens physically grouped together. For circular tokens typically found in casino gaming environments (e.g., gaming chips 131), these may be grouped together into a vertical stack. In another example in which the tokens are monetary bills and coins, a group of bills and coins may be considered a "stack" based on the physical contact of the group with each other and other factors as described herein. Thus, while examples herein illustrate circular tokens, other embodiments can utilize different shapes, such as rectangular shaped columns of a chip tray in which rectangular-shaped tokens can be placed.

In the example embodiment, the tracking controller 204 is communicatively coupled to the imaging system 206 to monitor the gaming area 201. More specifically, the imaging system 206 includes one or more sensors configured to collect sensor data associated with the gaming area 201, and the tracking controller 204 receives and analyzes the collected sensor data to detect and monitor physical objects. The imaging system 206 may include any suitable number, type, and/or configuration of sensors to provide sensor data to the game controller 202, the tracking controller 204, and/or another device that may benefit from the sensor data.

In the example embodiment, the imaging system 206 includes at least one image sensor that is oriented to capture image data of physical objects in the gaming area 201. In one example, the imaging system 206 may include a single image sensor that monitors tokens in the chip tray 130 and/or additional objects in the gaming area 201. In another example, the imaging system 206 includes a plurality of image sensors that monitor subdivisions of the chip tray 130 and/or the gaming area 201. The image sensor may be part of a camera unit of the imaging system 206 or a three-dimensional (3D) camera unit in which the image sensor, in combination with other image sensors and/or other types of sensors, may collect depth data related to the image data, which may be used to distinguish between objects within the image data. The image data is transmitted to the tracking controller 204 for analysis as described herein. In some embodiments, the image sensor is configured to transmit the image data with limited image processing or analysis such that the tracking controller 204 and/or another device receiving the image data performs the image processing and analysis. In other embodiments, the image sensor may perform at least some preliminary image processing and/or analysis prior to transmitting the image data. In such embodiments, the image sensor may be considered an extension of the tracking controller 204, and as such, functionality described herein related to image processing and analysis that is performed by the tracking controller 204 may be performed by the image sensor (or a dedicated computing device of the image sensor). In certain embodiments, the imaging system 206 may include, in addition to or instead of the image sensor, one or more sensors configured to detect objects, such as time-of-flight sensors, radar sensors (e.g., LIDAR), thermographic sensors, and the like.

The tracking controller 204 is configured to establish data structures relating to various physical objects detected in the image data from the image sensor. For example, the tracking controller 204 applies one or more image neural network models during image analysis that are trained to detect aspects of physical objects. Neural network models are analysis tools that classify "raw" or unclassified input data without requiring user input. That is, in the case of the raw image data captured by the image sensor, the neural network models may be used to translate patterns within the image data to data object representations of, for example, tokens, token edges, colors, patterns, faces, hands, etc., thereby facilitating data storage and analysis of objects detected in the image data as described herein.

At a simplified level, neural network models are a set of node functions that have a respective weight applied to each function. The node functions and the respective weights are configured to receive some form of raw input data (e.g., image data), establish patterns within the raw input data, and generate outputs based on the established patterns. The weights are applied to the node functions to facilitate refinement of the model to recognize certain patterns (i.e., increased weight is given to node functions resulting in correct outputs), and/or to adapt to new patterns. For example, a neural network model may be configured to receive input data, detect patterns in the image data representing gaming chip parts, human body parts, etc., perform image segmentation, and generate an output that classifies one or more portions of the image data as representative of segments of a chip, a player's body parts (e.g., a box having coordinates relative to the image data that encapsulates a face, an arm, a hand, etc. and classifies the encapsulated area as a "human," "face," "arm," "hand," etc.), and so forth.

For instance, to train a neural network to identify the most relevant predictions for identifying a chip part or a human body part, for example, a predetermined dataset of raw image data including image data of chips and/or human body parts, and with known outputs, is provided to the neural network. As each node function is applied to the raw input of a known output, an error correction analysis is performed such that node functions that result in outputs near or matching the known output may be given an increased weight while node functions having a significant error may be given a decreased weight. In the example of identifying a gaming chip, node functions that consistently recognize image patterns of chip edge features (e.g., colors, shapes, patterns, etc.) may be given additional weight. In the example of identifying a human face, node functions that consistently recognize image patterns of facial features (e.g., nose, eyes, mouth, etc.) may be given additional weight. Similarly, in the example of identifying a human hand, node functions that consistently recognize image patterns of hand features (e.g., wrist, fingers, palm, etc.) may be given additional weight. The outputs of the node functions (including the respective weights) are then evaluated in combination to provide an output such as a data structure representing a human face. Training may be repeated to further refine the pattern-recognition of the model, and the model may still be refined during deployment (i.e., raw input without a known data output).

At least some of the neural network models applied by the tracking controller 204 may be deep neural network (DNN) models. DNN models include at least three layers of node functions linked together to break the complexity of image analysis into a series of steps of increasing abstraction from the original image data. For example, for a DNN model trained to detect human faces from an image, a first layer may be trained to identify groups of pixels that represent the boundary of facial features, a second layer may be trained to identify the facial features as a whole based on the identified boundaries, and a third layer may be trained to determine whether or not the identified facial features form a face and distinguish the face from other faces. The multi-layered nature of the DNN models may facilitate more targeted weights, a reduced number of node functions, and/or pipeline processing of the image data (e.g., for a three-layered DNN model, each stage of the model may process three frames of image data in parallel).

In at least some embodiments, each model applied by the tracking controller 204 may be configured to identify a particular aspect of the image data and provide different outputs such that the tracking controller 204 may aggregate the outputs of the neural network models together to identify physical objects as described herein. For example, one model may be trained to identify chips edge features. For example, different models may be trained to identify chips from different viewing perspectives (e.g., from top or bottom viewing perspectives). Another model may be trained to identify writing on chips (e.g., written values that indicate a chip denomination). Furthermore, in some embodiments, the different models may be trained to detect human faces, while another model may be trained to identify the bodies of players. In such an example, the tracking controller 204 may link together the different outcomes of models (e.g., the tracking controller 204 links together the detection of a face of a player to a detection of a body of the player by analyzing the outputs off the two models). In other embodiments, a single DNN model may be applied to perform the functionality of several models.

As described in further detail below, the tracking controller 204 may generate data objects for each physical object identified within the captured image data by the DNN models. The data objects are data structures that are generated to link together data associated with corresponding physical objects. For example, the outputs of several DNN models associated with a player may be linked together as part of a player data object.

It is to be understood that the underlying data storage of the data objects may vary in accordance with the computing environment of the memory device or devices that store the data object. That is, factors such as programming language and file system may vary the where and/or how the data object is stored (e.g., via a single block allocation of data storage, via distributed storage with pointers linking the data together, etc.). In addition, some data objects may be stored across several different memory devices or databases.

In some embodiments, the player data objects include a player identifier, and data objects of other physical objects include other identifiers. The identifiers uniquely identify the physical objects such that the data stored within the data objects is tied to the physical objects. In some embodiments, the identifiers may be incorporated into other systems or subsystems. For example, a player account system may store player identifiers as part of player accounts, which may be used to provide benefits, rewards, and the like to players. In certain embodiments, the identifiers may be provided to the tracking controller 204 by other systems that may have already generated the identifiers.

In at least some embodiments, the data objects and identifiers may be stored by the tracking database system 208. The tracking database system 208 includes one or more data storage devices (e.g., one or more databases) that store data from at least the tracking controller 204 in a structured, addressable manner. That is, the tracking database system 208 stores data according to one or more linked metadata fields that identify the type of data stored and can be used to group stored data together across several metadata fields. The stored data is addressable such that stored data within the tracking database system 208 may be tracked after initial storage for retrieval, deletion, and/or subsequent data manipulation (e.g., editing or moving the data). The tracking database system 208 may be formatted according to one or more suitable file system structures (e.g., FAT, exFAT, ext4, NTFS, etc.).

The tracking database system 208 may be a distributed system (i.e., the data storage devices are distributed to a plurality of computing devices) or a single device system. In certain embodiments, the tracking database system 208 may be integrated with one or more computing devices configured to provide other functionality to the gaming system 200 and/or other gaming systems. For example, the tracking database system 208 may be integrated with the tracking controller 204 or the server system 214.

In the example embodiment, the tracking database system 208 is configured to facilitate a lookup function on the stored data for the tracking controller 204. The lookup function compares input data provided by the tracking controller 204 to the data stored within the tracking database system 208 to identify any "matching" data. It is to be understood that "matching" within the context of the lookup function may refer to the input data being the same, substantially similar, or linked to stored data in the tracking database system 208. For example, if the input data is an image of a player's face, the lookup function may be performed to compare the input data to a set of stored images of historical players to determine whether or not the player captured in the input data is a returning player. In this example, one or more image comparison techniques may be used to identify any "matching" image stored by the tracking database system 208. For example, key visual markers for distinguishing the player may be extracted from the input data and compared to similar key visual markers of the stored data. If the same or substantially similar visual markers are found within the tracking database system 208, the matching stored image may be retrieved. In addition to or instead of the matching image, other data linked to the matching stored image may be retrieved during the lookup function, such as a player account number, the player's name, etc. In at least some embodiments, the tracking database system 208 includes at least one computing device that is configured to perform the lookup function. In other embodiments, the lookup function is performed by a device in communication with the tracking database system 208 (e.g., the tracking controller 204) or a device in which the tracking database system 208 is integrated within.

Figure 4:
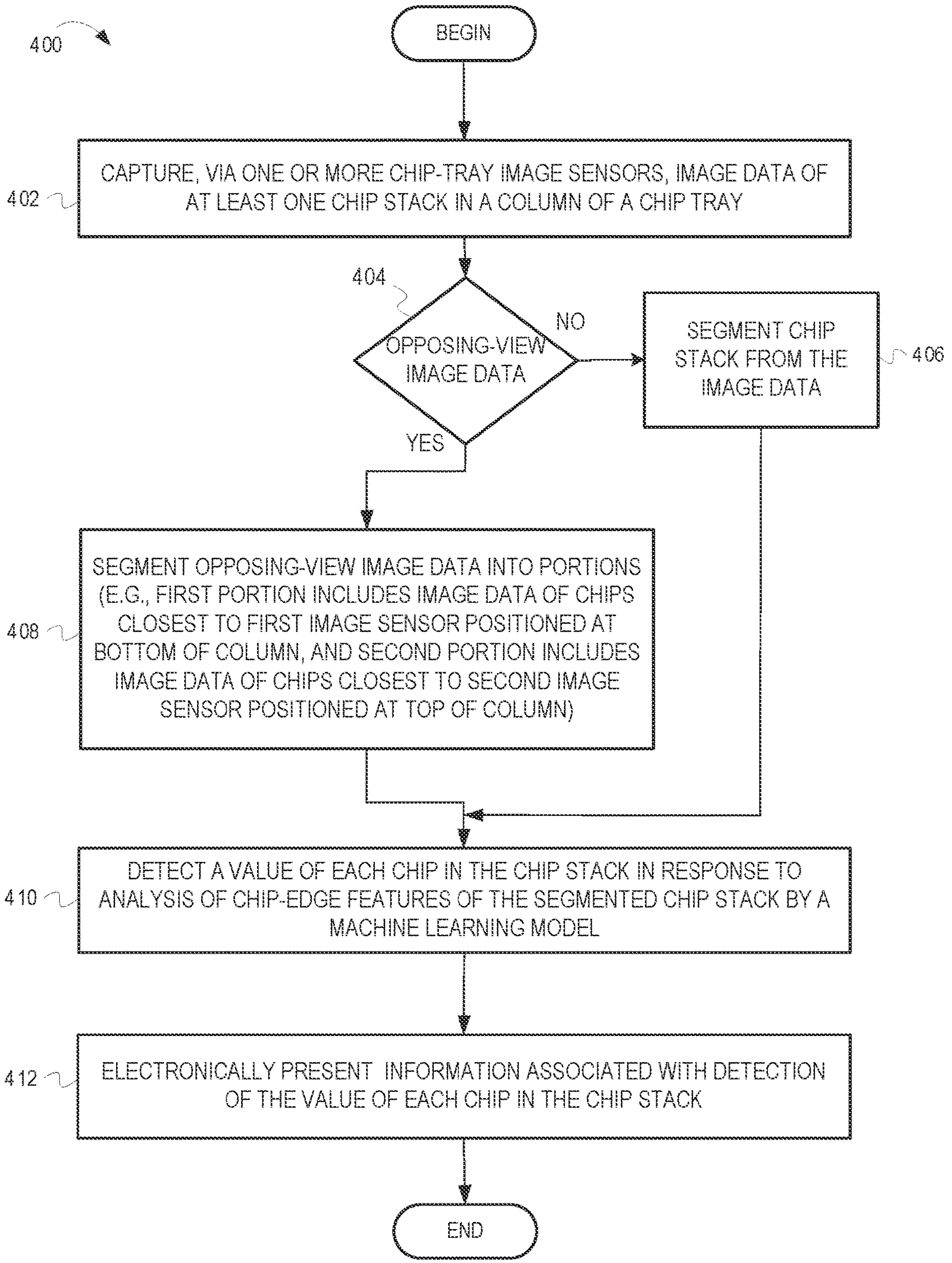
FIG. 4 is a flow diagram of an example method according to one or more embodiments of the present disclosure.

FIG. 4 is a flow diagram of an example method according to one or more embodiments of the present disclosure.

Figure 5:
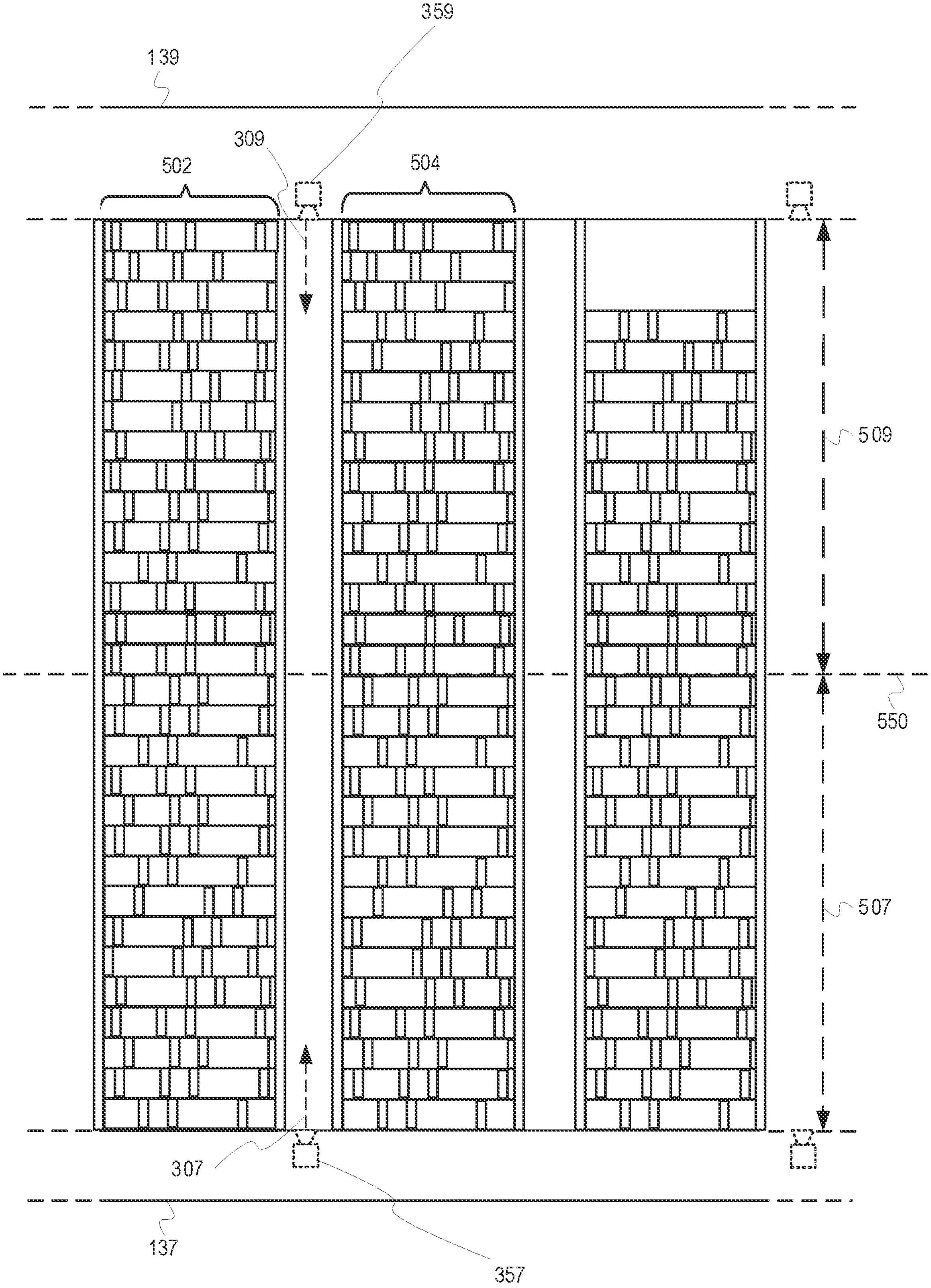
FIG. 5 is a diagram of an exemplary system according to one or more embodiments of the present disclosure.
Figure 6:
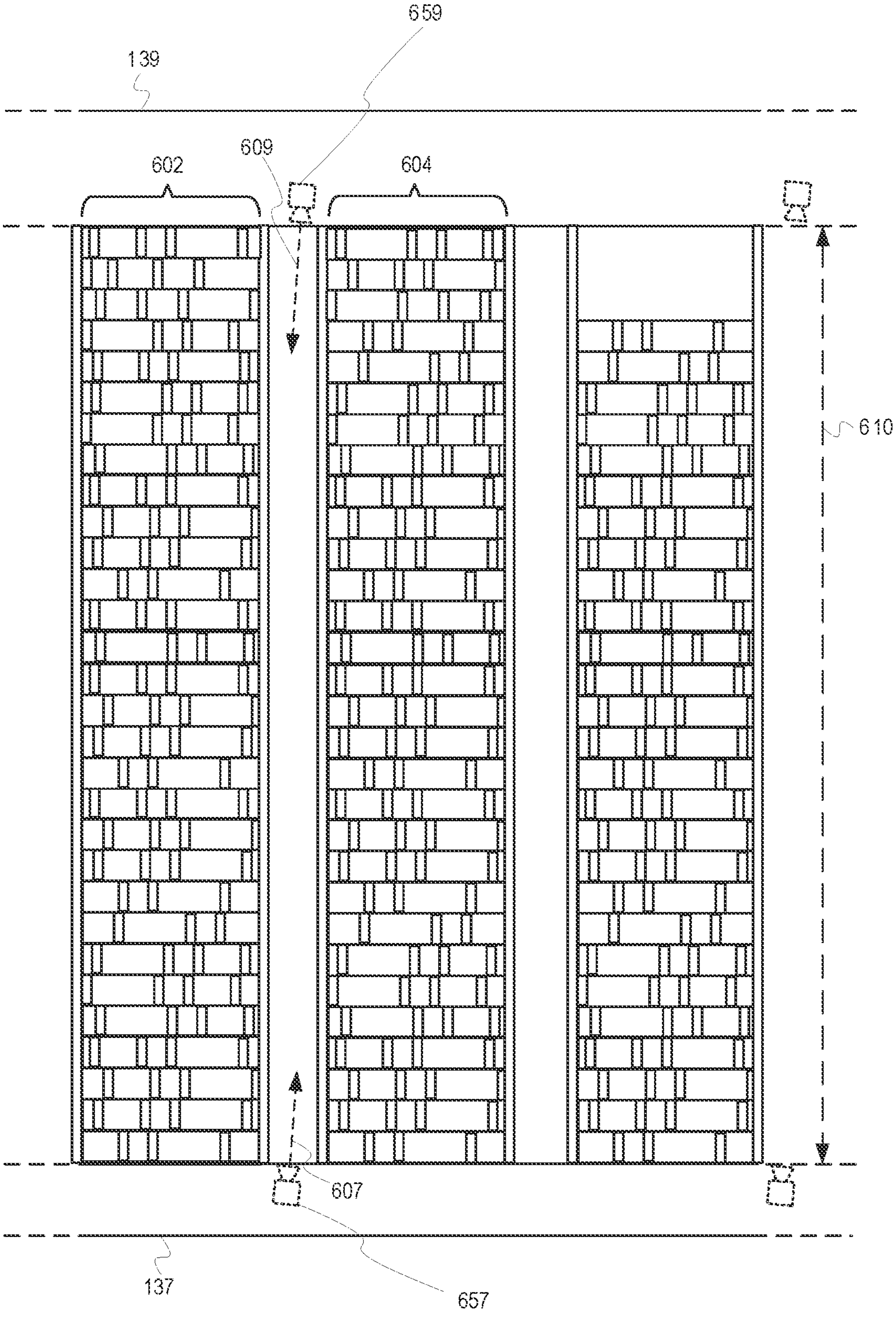
FIG. 6 is a diagram of an exemplary system according to one or more embodiments of the present disclosure.
Figure 7A:
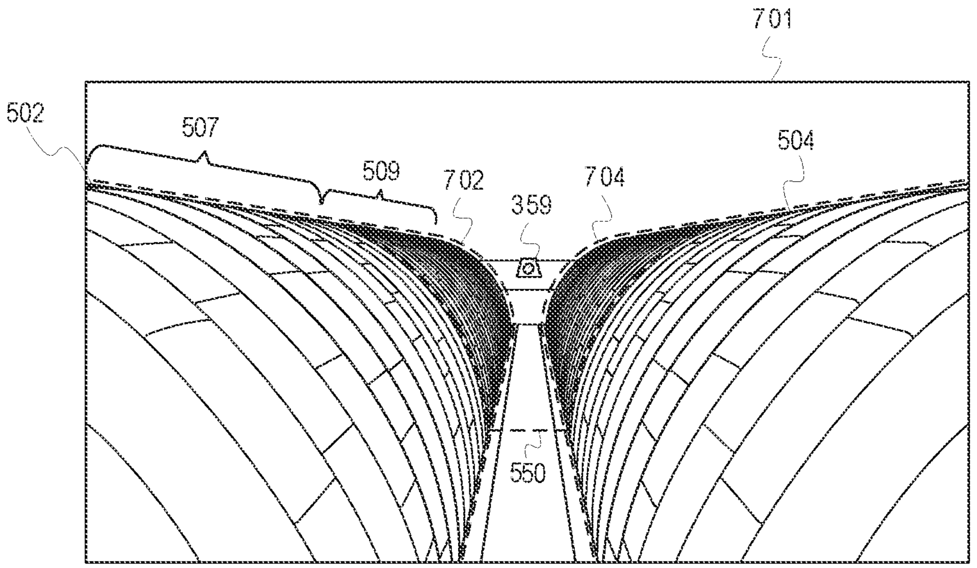
FIGS. 7A and 7B are diagrams of example images taken according to embodiments of the present disclosure.
Figure 7B:
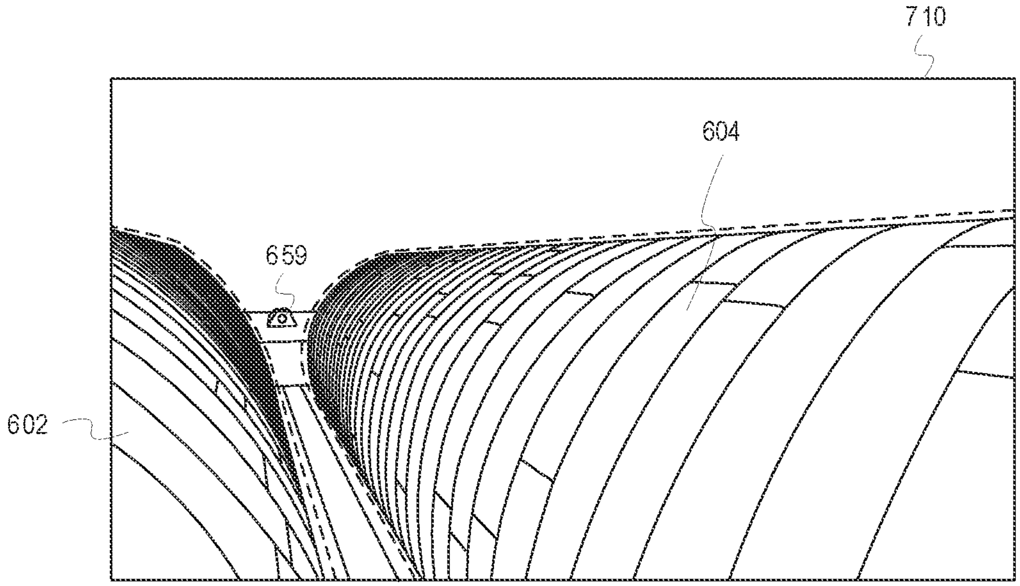

In FIG. 4, a flow 400 begins at processing block 402 where a processor captures, via one or more embedded-chip tray image sensors, image data of at least one chip stack in a column of a chip tray. The image sensors are positioned between at least every other one of the pairs of chip-tray columns (e.g., as shown in FIG. 1) and are aligned substantially parallel to a vertical height of the columns 132 (e.g., as described in FIG. 3). In FIG. 3 the viewing perspective 307 is aligned to look up the entire column 332 (as well as any adjacent column to column 332) to capture an image of at least one side of each of the adjacent chip stacks in the adjacent columns. The viewing perspective 309 is aligned to look down the entire column 332 to capture an image of at least one side of each of the adjacent chip stacks, from the opposite viewing perspective as viewing perspective 307. In some embodiments, the viewing perspective 309 and viewing perspective 307 are aligned to each other. In other embodiments, however, the alignment does not have to be exact, so long as each viewing perspective captures image data for the entire length of the column 332 and/or is configured to know where a dividing line can be drawn between an upper and lower portion of the chip stacks. One example of capturing image data is illustrated in FIG. 5. Two chip stacks 502 and 504 are shown. The image sensor 357, for instance, captures an image of the chip stacks 502 and 504 according to viewing perspective 307. Referring momentarily to FIG. 7A, one example of a captured image is the image 701. The viewing perspective of the image 701 is from that of an imbedded image sensor centered between the chip stacks 502 and 504 (e.g., as shown in FIG. 5). In another example, referring momentarily to FIG. 7B, one example of a captured image is image 710. The viewing perspective of the image 710 is from that of an angled, embedded image sensor that is positioned between the two chip stacks 602 and 604 (e.g., as shown in FIG. 6). In some embodiments, based on the change in position, the tracking controller 204 can move a dividing line 550 as necessary to segment the best quality image data for analysis by the machine learning model. For example, as shown in FIG. 5, the dividing line 550 is shown half way between the top and bottom of the columns in which the chip stacks 502 and 504 are resting. In FIG. 5, for example, the tracking controller 204 can crop an image taken from the image sensor 357 to include only the portion of a bottom half 507 of the chip stacks. Similarly, the tracking controller can crop an image taken from the image sensor 359 to include only the portion of the top half 509 of the chip stacks. In the example shown in FIG. 6, however, the image sensors 659 and 657 are positioned and angled such as to capture sufficient image data for an entire chip stack from angled viewing perspective 609 and 607. The viewing perspectives 609 and 607 are not directly aligned to each other, yet still are aligned substantially parallel to the height of the chip stacks 602 and 604 (within a small rotational range that captures all necessary detail for an entire chip stack depending on a known height of the chip columns and/or chip stacks 602 and 604). Thus the tracking controller 204 can utilize an entire image area 610 of the chip stack 604 and/or 602 to analyze and assess chip features.

In some embodiments, an image sensor is affixed by a material of the chip tray (e.g., at least a portion of the image sensor is embedded into the structure of the chip tray), yet still retains some degree of movement. For example, in some embodiments, an image sensor may have a range of automated movement, such as to shift laterally, rotate, etc. between the positions shown in FIG. 5 and FIG. 6, (or other positions not shown). Thus, the tracking controller 204 can move the image sensor to a position, within the range of motion, which captures an image from the best possible position to obtain image data with sufficient image quality to detect distinguishing chip features.

Referring back to FIG. 4, the flow 400 continues at processing block 404 where the processor determines whether there is opposing-viewpoint image data. For example, the tracking controller 204 can determine whether there is one image sensor or two image sensors in the chip-tray. If there are opposing image sensors, the tracking controller 204 can determine whether to capture one or two images. In some instances, the tracking controller 204 can determine that, with one image there is enough detail to detect all chips in a chip stack. For example, in some instances adjacent chip stacks may less than half full. Consequently, an image captured from only a bottom image sensor would have higher resolution of any segmented image than would an image captured from a top image sensor. Consequently, the tracking controller 204 can utilize only one image (i.e., the image taken from a bottom image sensor).

Referring back to FIG. 4, if, at processing block 404, the processor determines that there is no opposing-viewpoint image data the flow 400 continues at processing block 406 with segmenting the entire chip stack from the image data. For instance, given that the image sensors 157 are positioned between adjacent columns, each one can capture both chip-stacks in a single image. The tracking controller 204 can segment the image into left and right halves, each half representing the different adjacent chip stacks. For example, in FIG. 7A, the tracking controller 204 can analyze image data of image 701 (e.g., via a machine learning model) and segment the image data of the image 701 for chip stack 502 and the chip stack 504 via computerized image segmentation. For example, in some embodiments, the tracking controller 204 partitions the digital image of the chip stacks 502 and 504 and detects (e.g., via the machine learning model) the outer edges of the chip stacks (as illustrated by outlines 702 and 704 of the image objects (e.g., sets of pixels) associated with each of the chip stacks 502 and 504). The tracking controller 204 can illustrate the outlines 702 and 704, via a virtual graphical layer (e.g., of a virtual scene) that overlays the image data 701. In some embodiments, the tracking controller 204 detects a direction of the slope and, in response to detecting the direction of the slope, determines boundaries for an upper portion and a lower portion of the image data (e.g., boundaries associated with the layout of outlines 702 and 704 as well as boundaries related to the dividing line 550).

Referring back to FIG. 4, at processing block 404, if the processor determines that there is opposing-viewpoint image data, the flow 400 continues at processing block 408 with segmenting the opposing-viewpoint image data into portions. For example, the processor may detect that there are two opposing-viewpoint image sensors for a column. The processor, therefore, may split the image data into two halves (e.g., equivalent geometric halves), where a first half includes image data of chips closest to a first image sensor positioned at a bottom of a column, and a second half includes image data of chips closest to a second image sensor positioned at a top of a column. For example, as illustrated in FIG. 7A, the tracking controller 204 can segment the image 701 into top and bottom halves around the dividing line 550. In some embodiments, the dividing line 550 divides the image 701 (e.g., at a central point), where the segmented image 701 includes a top portion 509 and a bottom portion 507 of the chip stack 502 and chip stack 504 (see also FIG. 5). The top portion 509 includes image data of chips closest to the image sensor 359, and the bottom portion includes image data of chips closest to the image sensor 357. In some embodiments, the dividing line 550 can divide the image 701 at other points other than a central point. For example, the image quality of the image sensor 357 may be sufficient to ensure that a majority of each of the chip stacks 502 and 504 may be clearly visible within a single image. Thus, the tracking controller 204 may not need to divide the image 701 into equal halves, but may instead move the dividing line 550 to a point in the chip stacks 502 and 504 where the image quality of the top half 509 of image 701 is low, such as at a three-quarters mark. For example, the image quality of the top quarter of a full chip stack may appear grainy in the image 701 taken from the viewing perspective of the bottom image sensor (image sensor 357), thus the tracking controller 204 can use the image data taken from the top image sensor (image sensor 359) to analyze the upper quarter of the image near the top of the chip stacks 502 and 504.

Referring back to FIG. 4, the flow 400 continues at processing block 410 where the processor detects a value of each chip in the chip stack in response to analysis of chip-edge features of the segmented chip stack by a machine learning model. For example, in some embodiments, a machine learning model is trained to detect the dimensions, colors, patterns, shapes, etc. on the edges of chips within the chip stacks from the viewing perspective of the one or more image sensors positioned relative to the chip stacks as described (e.g., images sensors positioned between columns and aligned substantially parallel to a vertical height of the column). The machine learning model can be trained using images of real chips, having known dimension, which are stacked within the columns of the chip tray. In other embodiments, the machine learning model can be trained using simulated images of chips as they would appear from an affixed distance and position of the image sensors that are embedded (or otherwise affixed) in their positions relative to the columns. Given that gaming chips have a known standard shape and size, the simulated images can be realistically generated having known chip dimensions (e.g., shapes, sizes, widths, etc.) from the viewing perspective of the affixed image sensors. Further, the simulated images can be graphically skinned with the colors, denomination-identification patterns, etc. of known chips. Based on the training, the machine learning model is trained to detect the color, pattern, shape, etc., of specific denomination values of any chip within the stack. Furthermore, the tracking controller 204 uses the machine learning model to detect the chip values in the chip stacks.

Referring back to FIG. 4, the flow 400 continues at processing block 412 where the processor electronically presents information associated with detection of the value of each chip in the chip stack. The tracking controller 204 can present, on a display, images of the chip stacks. In some instances, the tracking controller superimpose the information via a virtual and/or graphical layer positioned over the image data (e.g., as a virtual reality scene or augmented reality overlay). In some embodiments, the tracking controller 204 can add up the value of the chips in the chip stack and present a value of an entire chip stack. The tracking controller 204 can further add all of the values of the chips stacks of a certain denomination value and present information related to the separate denominations. Further, the tracking controller can add all values of chips stacks in the chip tray to present a total count of the chips in the chip tray. In addition, the tracking controller can present warnings associated with a misplaced chip as detected by the machine learning model.

Furthermore, in some embodiments, the tracking controller 204 can transmit the information to other devices connected to a network (e.g., gaming table network, gaming machine network, computer network, communication network, etc.) for presentation via other devices, display, etc. In some instances, the tracking controller 204 can communicate the image data, as well as the determined information, wirelessly to a mobile device (e.g., to present via a headset, a mobile device, a table computer, etc. that is worn or carried by a dealer, a pit boss, etc.).

Figure 8:
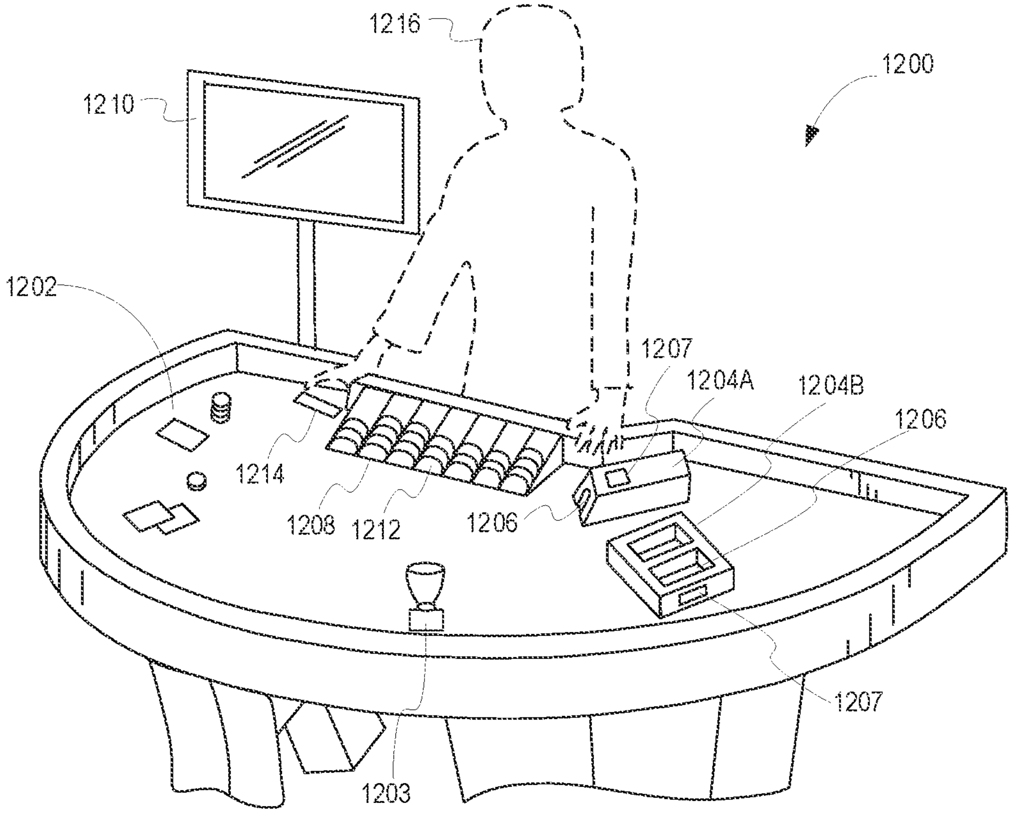
FIG. 8 is a top view of a table configured for implementation of embodiments of wagering games in accordance with this disclosure.

FIG. 8 is a perspective view of an embodiment of a gaming table 1200 (which may be configured as the gaming table 101 or the gaming table 401) for implementing wagering games in accordance with this disclosure. The gaming table 1200 may be a physical article of furniture around which participants in the wagering game may stand or sit and on which the physical objects used for administering and otherwise participating in the wagering game may be supported, positioned, moved, transferred, and otherwise manipulated. For example, the gaming table 1200 may include a gaming surface 1202 (e.g., a table surface) on which the physical objects used in administering the wagering game may be located. The gaming surface 1202 may be, for example, a felt fabric covering a hard surface of the table, and a design, conventionally referred to as a "layout," specific to the game being administered may be physically printed on the gaming surface 1202. As another example, the gaming surface 1202 may be a surface of a transparent or translucent material (e.g., glass or plexiglass) onto which a projector 1203, which may be located, for example, above or below the gaming surface 1202, may illuminate a layout specific to the wagering game being administered. In such an example, the specific layout projected onto the gaming surface 1202 may be changeable, enabling the gaming table 1200 to be used to administer different variations of wagering games within the scope of this disclosure or other wagering games. In either example, the gaming surface 1202 may include, for example, designated areas for player positions; areas in which one or more of player cards, dealer cards, or community cards may be dealt; areas in which wagers may be accepted; areas in which wagers may be grouped into pots; and areas in which rules, pay tables, and other instructions related to the wagering game may be displayed. As a specific, nonlimiting example, the gaming surface 1202 may be configured as any table surface described herein.

In some embodiments, the gaming table 1200 may include a display 1210 separate from the gaming surface 1202. The display 1210 may be configured to face players, prospective players, and spectators and may display, for example, information randomly selected by a shuffler device and also displayed on a display of the shuffler device; rules; pay tables; real-time game status, such as wagers accepted and cards dealt; historical game information, such as amounts won, amounts wagered, percentage of hands won, and notable hands achieved; the commercial game name, the casino name, advertising and other instructions and information related to the wagering game. The display 1210 may be a physically fixed display, such as an edge lit sign, in some embodiments. In other embodiments, the display 1210 may change automatically in response to a stimulus (e.g., may be an electronic video monitor).

The gaming table 1200 may include particular machines and apparatuses configured to facilitate the administration of the wagering game. For example, the gaming table 1200 may include one or more card-handling devices 1204A, 1204B. The card-handling device 1204A may be, for example, a shoe from which physical cards 1206 from one or more decks of intermixed playing cards may be withdrawn, one at a time. Such a card-handling device 1204A may include, for example, a housing in which cards 1206 are located, an opening from which cards 1206 are removed, and a card-presenting mechanism (e.g., a moving weight on a ramp configured to push a stack of cards down the ramp) configured to continually present new cards 1206 for withdrawal from the shoe.

In some embodiments in which the card-handling device 1204A is used, the card-handling device 1204A may include a random number generator and a display, in addition to or rather than such features being included in a shuffler device. In addition to the card-handling device 1204A, the card-handling device 1204B may be included. The card-handling device 1204B may be, for example, a shuffler configured to select information (using a random number generator), to display the selected information on a display of the shuffler, to reorder (either randomly or pseudo-randomly) physical playing cards 1206 from one or more decks of playing cards, and to present randomized cards 1206 for use in the wagering game. Such a card-handling device 1204B may include, for example, a housing, a shuffling mechanism configured to shuffle cards, and card inputs and outputs (e.g., trays). Shufflers may include card recognition capability that can form a randomly ordered set of cards within the shuffler. The card-handling device 1204 may also be, for example, a combination shuffler and shoe in which the output for the shuffler is a shoe.

In some embodiments, the card-handling device 1204 may be configured and programmed to administer at least a portion of a wagering game being played utilizing the card-handling device 1204. For example, the card-handling device 1204 may be programmed and configured to randomize a set of cards and deliver cards individually for use according to game rules and player and or dealer game play elections. More specifically, the card-handling device 1204 may be programmed and configured to, for example, randomize a set of six complete decks of cards including one or more standard 52-card decks of playing cards and, optionally, any specialty cards (e.g., a cut card, bonus cards, wild cards, or other specialty cards). In some embodiments, the card-handling device 1204 may present individual cards, one at a time, for withdrawal from the card-handling device 1204. In other embodiments, the card-handling device 1204 may present an entire shuffled block of cards that are transferred manually or automatically into a card dispensing shoe 1204. In some such embodiments, the card-handling device 1204 may accept dealer input, such as, for example, a number of replacement cards for discarded cards, a number of hit cards to add, or a number of partial hands to be completed. In other embodiments, the device may accept a dealer input from a menu of game options indicating a game selection, which will select programming to cause the card-handling device 1204 to deliver the requisite number of cards to the game according to game rules, player decisions and dealer decisions. In still other embodiments, the card-handling device 1204 may present the complete set of randomized cards for manual or automatic withdrawal from a shuffler and then insertion into a shoe. As specific, nonlimiting examples, the card-handling device 1204 may present a complete set of cards to be manually or automatically transferred into a card dispensing shoe, or may provide a continuous supply of individual cards.

In another embodiment, the card handling device may be a batch shuffler, such as by randomizing a set of cards using a gripping, lifting, and insertion sequence.

In some embodiments, the card-handling device 1204 may employ a random number generator device to determine card order, such as, for example, a final card order or an order of insertion of cards into a compartment configured to form a packet of cards. The compartments may be sequentially numbered, and a random number assigned to each compartment number prior to delivery of the first card. In other embodiments, the random number generator may select a location in the stack of cards to separate the stack into two sub-stacks, creating an insertion point within the stack at a random location. The next card may be inserted into the insertion point. In yet other embodiments, the random number generator may randomly select a location in a stack to randomly remove cards by activating an ejector.

Regardless of whether the random number generator (or generators) is hardware or software, it may be used to implement specific game administrations methods of the present disclosure.

The card-handling device 1204 may simply be supported on the gaming surface 1202 in some embodiments. In other embodiments, the card-handling device 1204 may be mounted into the gaming table 1202 such that the card-handling device 1204 is not manually removable from the gaming table 1202 without the use of tools. In some embodiments, the deck or decks of playing cards used may be standard, 52-card decks. In other embodiments, the deck or decks used may include cards, such as, for example, jokers, wild cards, bonus cards, etc. The shuffler may also be configured to handle and dispense security cards, such as cut cards.

In some embodiments, the card-handling device 1204 may include an electronic display 1207 for displaying information related to the wagering game being administered. The electronic display 1207 may display a menu of game options, the name of the game selected, the number of cards per hand to be dispensed, acceptable amounts for other wagers (e.g., maximums and minimums), numbers of cards to be dealt to recipients, locations of particular recipients for particular cards, winning and losing wagers, pay tables, winning hands, losing hands, and payout amounts. In other embodiments, information related to the wagering game may be displayed on another electronic display, such as, for example, the display 1210 described previously.

The type of card-handling device 1204 employed to administer embodiments of the disclosed wagering game, as well as the type of card deck employed and the number of decks, may be specific to the game to be implemented. Cards used in games of this disclosure may be, for example, standard playing cards from one or more decks, each deck having cards of four suits (clubs, hearts, diamonds, and spades) and of rankings ace, king, queen, jack, and ten through two in descending order. As a more specific example, six, seven, or eight standard decks of such cards may be intermixed. Typically, six or eight decks of 52 standard playing cards each may be intermixed and formed into a set to administer a blackjack or blackjack variant game. After shuffling, the randomized set may be transferred into another portion of the card-handling device 1204B or another card-handling device 1204A altogether, such as a mechanized shoe capable of reading card rank and suit.

The gaming table 1200 may include one or more chip racks 1208 configured to facilitate accepting wagers, transferring lost wagers to the house, and exchanging monetary value for wagering elements 1212 (e.g., chips). For example, the chip rack 1208 (also referred to as a chip tray herein, e.g., chip tray 130) may include a series of token support columns, each of which may support tokens of a different type (e.g., color and denomination). In some embodiments, the chip rack 1208 may be configured to automatically present a selected number of chips using a chip-cutting-and-delivery mechanism. In the example shown in FIG. 8, the chip rack 1208 is positioned such that the slope of chip stacks angle downward away from the dealer 1216 (as opposed to FIG. 1, where the chip stacks are angled toward a dealer position). The tracking controller 204 can detect, for example, an orientation of the chip rack 1208 as positioned by the dealer to determine the direction of the slope, and thus can detect a relative bottom and top positions of a chip tray. In some embodiments, the gaming table 1200 may include a drop box 1214 for money that is accepted in exchange for wagering elements or chips 1212. The drop box 1214 may be, for example, a secure container (e.g., a safe or lockbox) having a one-way opening into which money may be inserted and a secure, lockable opening from which money may be retrieved. Such drop boxes 1214 are known in the art, and may be incorporated directly into the gaming table 1200 and may, in some embodiments, have a removable container for the retrieval of money in a separate, secure location.

When administering a wagering game in accordance with embodiments of this disclosure, a dealer 1216 may receive money (e.g., cash) from a player in exchange for wagering elements 1212. The dealer 1216 may deposit the money in the drop box 1214 and transfer physical wagering elements 1212 to the player. As part of the method of administering the game, the dealer 1216 may accept one or more initial wagers from the player, which may be reflected by the dealer 1216 permitting the player to place one or more wagering elements 1212 or other wagering tokens (e.g., cash) within designated areas on the gaming surface 1202 associated with the various wagers of the wagering game. Once initial wagers have been accepted, the dealer 1216 may remove physical cards 1206 from the card-handling device 1204 (e.g., individual cards, packets of cards, or the complete set of cards) in some embodiments. In other embodiments, the physical cards 1206 may be hand-pitched (i.e., the dealer 1216 may optionally shuffle the cards 1206 to randomize the set and may hand-deal cards 1206 from the randomized set of cards). The dealer 1216 may position cards 1206 within designated areas on the gaming surface 1202, which may designate the cards 1206 for use as individual player cards, community cards, or dealer cards in accordance with game rules. House rules may require the dealer to accept both main and secondary wagers before card distribution. House rules may alternatively allow the player to place only one wager (i.e., the second wager) during card distribution and after the initial wagers have been placed, or after card distribution but before all cards available for play are revealed.

In some embodiments, after dealing the cards 1206, and during play, according to the game rules, any additional wagers (e.g., the play wager) may be accepted, which may be reflected by the dealer 1216 permitting the player to place one or more wagering elements 1212 within the designated area (i.e., area 124) on the gaming surface 1202 associated with the play wager of the wagering game. The dealer 1216 may perform any additional card dealing according to the game rules. Finally, the dealer 1216 may resolve the wagers, award winning wagers to the players, which may be accomplished by giving wagering elements 1212 from the chip rack 1208 to the players, and transferring losing wagers to the house, which may be accomplished by moving wagering elements 1212 from the player designated wagering areas to the chip rack 1208.

Figure 9:
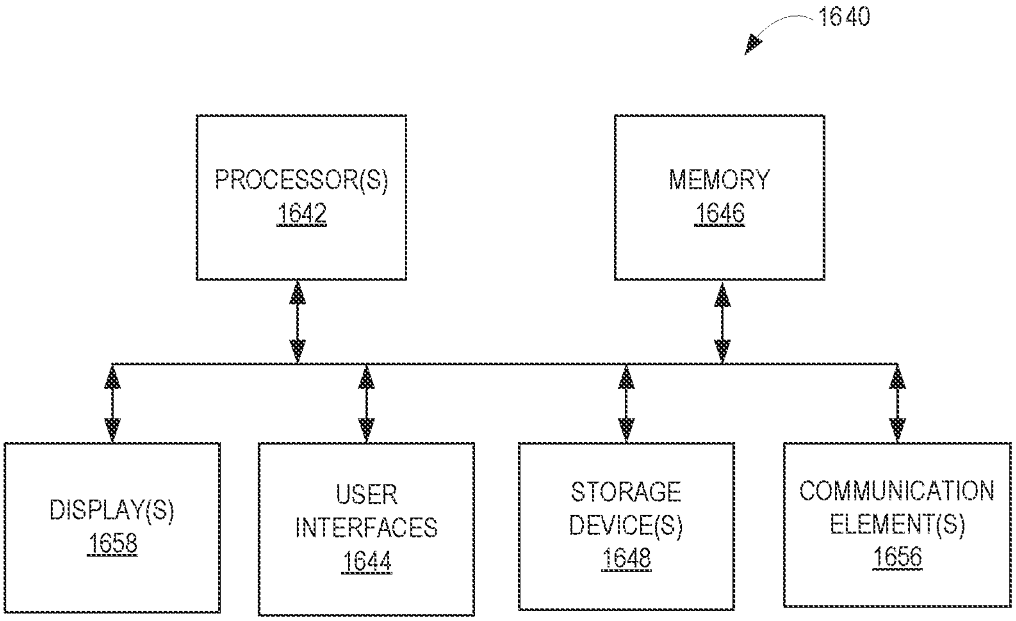
FIG. 9 is a block diagram of a computer for acting as a gaming system for implementing embodiments of wagering games in accordance with this disclosure.

FIG. 9 is a simplified block diagram showing elements of computing devices that may be used in systems and apparatuses of this disclosure. A computing system 1640 may be a user-type computer, a file server, a computer server, a notebook computer, a tablet, a handheld device, a mobile device, or other similar computer system for executing software. The computing system 1640 may be configured to execute software programs containing computing instructions and may include one or more processors 1642, memory 1646, one or more displays 1658, one or more user interface elements 1644, one or more communication elements 1656, and one or more storage devices 1648 (also referred to herein simply as storage 1648).

The processors 1642 may be configured to execute a wide variety of operating systems and applications including the computing instructions for administering wagering games of the present disclosure.

The processors 1642 may be configured as a general-purpose processor such as a microprocessor, but in the alternative, the general-purpose processor may be any processor, controller, microcontroller, or state machine suitable for carrying out processes of the present disclosure. The processor 1642 may also be implemented as a combination of computing devices, such as a combination of a DSP and a microprocessor, a plurality of microprocessors, one or more microprocessors in conjunction with a DSP core, or any other such configuration.

A general-purpose processor may be part of a general-purpose computer. However, when configured to execute instructions (e.g., software code) for carrying out embodiments of the present disclosure the general-purpose computer should be considered a special-purpose computer. Moreover, when configured according to embodiments of the present disclosure, such a special-purpose computer improves the function of a general-purpose computer because, absent the present disclosure, the general-purpose computer would not be able to carry out the processes of the present disclosure. The processes of the present disclosure, when carried out by the special-purpose computer, are processes that a human would not be able to perform in a reasonable amount of time due to the complexities of the data processing, decision making, communication, interactive nature, or combinations thereof for the present disclosure. The present disclosure also provides meaningful limitations in one or more particular technical environments that go beyond an abstract idea. For example, embodiments of the present disclosure provide improvements in the technical field related to the present disclosure.

The memory 1646 may be used to hold computing instructions, data, and other information for performing a wide variety of tasks including administering wagering games of the present disclosure. By way of example, and not limitation, the memory 1646 may include Synchronous Random Access Memory (SRAM), Dynamic RAM (DRAM), Read-Only Memory (ROM), Flash memory, and the like.

The display 1658 may be a wide variety of displays such as, for example, light-emitting diode displays, liquid crystal displays, cathode ray tubes, and the like. In addition, the display 1658 may be configured with a touch-screen feature for accepting user input as a user interface element 1644.

As nonlimiting examples, the user interface elements 1644 may include elements such as displays, keyboards, push-buttons, mice, joysticks, haptic devices, microphones, speakers, cameras, and touchscreens.

As nonlimiting examples, the communication elements 1656 may be configured for communicating with other devices or communication networks. As nonlimiting examples, the communication elements 1656 may include elements for communicating on wired and wireless communication media, such as for example, serial ports, parallel ports, Ethernet connections, universal serial bus (USB) connections, IEEE 1394 ("firewire") connections, THUNDERBOLT™ connections, BLUETOOTH® wireless networks, ZigBee wireless networks, 802.11 type wireless networks, cellular telephone/data networks, fiber optic networks and other suitable communication interfaces and protocols.

The storage 1648 may be used for storing relatively large amounts of nonvolatile information for use in the computing system 1640 and may be configured as one or more storage devices. By way of example and not limitation, these storage devices may include computer-readable media (CRM). This CRM may include, but is not limited to, magnetic and optical storage devices such as disk drives, magnetic tape, CDs (compact discs), DVDs (digital versatile discs or digital video discs), and semiconductor devices such as RAM, DRAM, ROM, EPROM, Flash memory, and other equivalent storage devices.

A person of ordinary skill in the art will recognize that the computing system 1640 may be configured in many different ways with different types of interconnecting buses between the various elements. Moreover, the various elements may be subdivided physically, functionally, or a combination thereof. As one nonlimiting example, the memory 1646 may be divided into cache memory, graphics memory, and main memory. Each of these memories may communicate directly or indirectly with the one or more processors 1642 on separate buses, partially combined buses, or a common bus.

As a specific, nonlimiting example, various methods and features of the present disclosure may be implemented in a mobile, remote, or mobile and remote environment over one or more of Internet, cellular communication (e.g., Broadband), near field communication networks and other communication networks referred to collectively herein as an iGaming environment. The iGaming environment may be accessed through social media environments such as FACEBOOK® and the like. DragonPlay Ltd, acquired by Bally Technologies Inc., provides an example of a platform to provide games to user devices, such as cellular telephones and other devices utilizing ANDROID®, iPHONE® and FACEBOOK® platforms. Where permitted by jurisdiction, the iGaming environment can include pay-to-play (P2P) gaming where a player, from their device, can make value based wagers and receive value based awards. Where P2P is not permitted the features can be expressed as entertainment only gaming where players wager virtual credits having no value or risk no wager whatsoever such as playing a promotion game or feature.

In some embodiments, wagering games may be administered in an at least partially player-pooled format, with payouts on pooled wagers being paid from a pot to players and losses on wagers being collected into the pot and eventually distributed to one or more players. Such player-pooled embodiments may include a player-pooled progressive embodiment, in which a pot is eventually distributed when a predetermined progressive-winning hand combination or composition is dealt. Player-pooled embodiments may also include a dividend refund embodiment, in which at least a portion of the pot is eventually distributed in the form of a refund distributed, e.g., pro-rata, to the players who contributed to the pot.

In some player-pooled embodiments, the game administrator may not obtain profits from chance-based events occurring in the wagering games that result in lost wagers. Instead, lost wagers may be redistributed back to the players. To profit from the wagering game, the game administrator may retain a commission, such as, for example, a player entrance fee or a rake taken on wagers, such that the amount obtained by the game administrator in exchange for hosting the wagering game is limited to the commission and is not based on the chance events occurring in the wagering game itself. The game administrator may also charge a rent of flat fee to participate.

It is noted that the methods described herein can be played with any number of standard decks of 52 cards (e.g., 1 deck to 10 decks). A standard deck is a collection of cards comprising an Ace, two, three, four, five, six, seven, eight, nine, ten, jack, queen, king, for each of four suits (comprising spades, diamonds, clubs, hearts) totaling 52 cards. Cards can be shuffled or a continuous shuffling machine (CSM) can be used. A standard deck of 52 cards can be used, as well as other kinds of decks, such as Spanish decks, decks with wild cards, etc. The operations described herein can be performed in any sensible order. Furthermore, numerous different variants of house rules can be applied.

Note that in the embodiments played using computers (a processor/processing unit), "virtual deck(s)" of cards are used instead of physical decks. A virtual deck is an electronic data structure used to represent a physical deck of cards which uses electronic representations for each respective card in the deck. In some embodiments, a virtual card is presented (e.g., displayed on an electronic output device using computer graphics, projected onto a surface of a physical table using a video projector, etc.) and is presented to mimic a real life image of that card.

Methods described herein can also be played on a physical table using physical cards and physical chips used to place wagers. Such physical chips can be directly redeemable for cash. When a player wins (dealer loses) the player's wager, the dealer will pay that player a respective payout amount. When a player loses (dealer wins) the player's wager, the dealer will take (collect) that wager from the player and typically place those chips in the dealer's chip rack. All rules, embodiments, features, etc. of a game being played can be communicated to the player (e.g., verbally or on a written rule card) before the game begins.

Initial cash deposits can be made into the electronic gaming machine which converts cash into electronic credits. Wagers can be placed in the form of electronic credits, which can be cashed out for real coins or a ticket (e.g., ticket-in-ticket-out) which can be redeemed at a casino cashier or kiosk for real cash and/or coins.

Any component of any embodiment described herein may include hardware, software, or any combination thereof.

Further, the operations described herein can be performed in any sensible order. Any operations not required for proper operation can be optional. Further, all methods described herein can also be stored as instructions on a computer readable storage medium, which instructions are operable by a computer processor. All variations and features described herein can be combined with any other features described herein without limitation. All features in all documents incorporated by reference herein can be combined with any feature(s) described herein, and also with all other features in all other documents incorporated by reference, without limitation.

Features of various embodiments of the inventive subject matter described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments which are defined only by the appended claims. Further, since numerous modifications and changes may readily occur to those skilled in the art, it is not desired to limit the inventive subject matter to the exact construction and operation illustrated and described, and accordingly all suitable modifications and equivalents may be resorted to, falling within the scope of the inventive subject matter.

What is claimed is:

1. An apparatus comprising:

a chip tray comprising columns;

image sensors positioned between at least two adjacent ones of the columns and aligned substantially parallel to a vertical height of the columns, wherein the image sensors have opposing viewpoints from a top and from a bottom of the at least two adjacent ones of the columns; and a tracking controller configured to perform operations that cause the apparatus to:

capture, via the image sensors, image data of a chip stack in at least one of the at least two adjacent ones of the columns, wherein the image data of the chip stack includes images of the chip stack from the opposing viewpoints;

segment, according to the images of the chip stack from the opposing viewpoints, the chip stack from the image data of the chip stack into an upper portion and a lower portion;

detect, via a machine learning model based on image data of the upper portion and the lower portion, a value of each gaming chip in the chip stack in response analysis of chip-edge features of each gaming chip in the chip stack; and electronically present information associated with detection of the value of each gaming chip in the chip stack.

2. The apparatus of claim 1, wherein at least a portion of the image sensors are embedded into a material of the chip tray and affixed between the at least two adjacent ones of the columns.

3. The apparatus of claim 1, wherein the image sensors are spaced between every other one of the columns.

4. The apparatus of claim 1, wherein the tracking controller is further configured to perform operations that cause the apparatus to:

segment the image data of the chip stack into side portions relative to the at least two adjacent ones of the columns;

detect, via the machine learning model, the chip stack from a first side portion associated with the at least one of the at least two adjacent ones of the columns; and detect, via the machine learning model, an additional chip stack in a second side portion associated with an additional one of the at least two adjacent ones of the columns.

5. The apparatus of claim 1, wherein the tracking controller configured to perform operations that cause the apparatus to segment, according to the images of the chip stack from the opposing viewpoints, the chip stack from the image data of the chip stack is further configured to perform operations to cause the apparatus to:

determine, in response to automated analysis of the opposing viewpoints from the image data of the chip stack, that the chip stack is taller than half of the vertical height of the at least one of the two adjacent ones of the columns; and segment the image data of the chip stack into the upper portion and the lower portion, wherein the upper portion includes image data, captured by a first of the image sensors, of chips closest to the top of the at least two adjacent ones of the columns, and wherein the lower portion includes image data, captured by a second of the image sensors, of chips closest to the bottom of the at least two adjacent ones of the columns.

6. The apparatus of claim 5, wherein the image sensors are aligned substantially parallel with a slope of a lower wall of the at least one of at least two adjacent ones of the columns.

7. The apparatus of claim 6, wherein the tracking controller is further configured to perform operations that cause the apparatus to:

detect a direction of the slope;

in response to detection of the direction of the slope, determine boundaries of the upper portion and the lower portion; and segment the image data of the chip stack according to the boundaries.

8. The apparatus of claim 1, wherein the tracking controller is configured to perform operations that cause the apparatus to electronically present, via a mobile device, the information as one or more of a virtual reality scene or an augmented reality layer overlaying the image data of the chip stack.

9. The apparatus of claim 1, wherein the tracking controller is further configured to perform operations that cause the apparatus to determine, in response to automated analysis of the images of the chip stack from the opposing viewpoints, a dividing line between the upper portion and the lower portion, wherein the each of the upper portion and the lower portion includes separate portions of the chip stack less than an entire vertical height of the chip stack, and wherein segmenting the chip stack comprises segmenting the chip stack from the image data of the chip stack into the upper portion and the lower portion according to the dividing line.

10. The apparatus of claim 1, wherein a first of the image sensors is located at the top of the two adjacent ones of the columns and a second of the image sensors is located at a bottom of the two adjacent ones of the columns.

11. The apparatus of claim 1, wherein the images of the chip stack from the opposing viewpoints have an inverse symmetrical relationship regarding where each pixel in the respective images of the chip stack relates to a given chip position, and wherein the tracking controller is further configured to perform operations that cause the apparatus to align, via inverse transformation, relative geometric positions of each gaming chip in the chip stack from each opposing viewpoint.

12. A method comprising:

capturing, by a processor via image sensors of a chip tray, image data of a chip stack of gaming chips, wherein the gaming chips are positioned in at least one of a plurality of columns of the chip tray, wherein the image sensors are positioned between at least two adjacent ones of the plurality of columns, wherein one or more viewing perspectives of the image sensors are aligned substantially parallel to a vertical height of the plurality of columns, wherein the image sensors have opposing viewpoints from a top and from a bottom of the at least two adjacent ones of the plurality of columns, and wherein the image data of the chip stack includes images of the chip stack from the opposing viewpoints;

segmenting, by the processor according to the images of the chip stack from the opposing viewpoints, the chip stack from the image data of the chip stack into an upper portion and a lower portion;

detecting, by the processor via a machine learning model based on image data of the upper portion and the lower portion, a value of each gaming chip in the chip stack in response analysis of chip-edge features of each gaming chip in the chip stack; and electronically presenting, by the processor, information in response to detecting the value of each gaming chip in the chip stack.

13. The method of claim 12, wherein at least a portion of the image sensors are embedded into a material of the chip tray and affixed between the at least two adjacent ones of the plurality of columns.

14. The method of claim 12, wherein the image sensors are spaced between every other one of the plurality of columns.

15. The method of claim 12 further comprising:

segmenting, by the processor, the image data of the chip stack into side portions relative to the at least two adjacent ones of the plurality of columns;

detecting the chip stack from a first side portion associated with the at least one of the plurality of columns; and detecting an additional chip stack in a second side portion associated with an additional one of the at least two adjacent ones of the plurality of columns, wherein the additional one of the at least two adjacent ones of the plurality of columns is adjacent to the at least one of the plurality of columns.

16. The method of claim 12 further comprising:

determining, in response to automated analysis of the opposing viewpoints from the image data of the chip stack by the processor, that the chip stack is taller than half of the vertical height of at least one of the plurality of columns; and segmenting the image data of the chip stack into the upper portion and the lower portion, wherein the upper portion includes image data of chips closest to the top of the at least two adjacent ones of the plurality of columns, and wherein the lower portion includes image data of chips closest to the bottom of the at least two adjacent ones of the plurality of columns.

17. The method of claim 16, wherein the image sensors are aligned substantially parallel with a slope of a lower wall of the at least one of the at least two adjacent ones of the plurality of columns.

18. The method of claim 17 further comprising:

detecting a direction of the slope;

in response to detecting the direction of the slope, determining boundaries of the upper portion and lower portion; and segmenting the image data of the chip stack according to the boundaries.

19. The method of claim 12 further comprising:

presenting, via a mobile device, the information as one or more of a virtual reality scene or an augmented reality layer overlaying the image data of the chip stack.

20. One or more non-transitory, machine readable mediums having instructions stored thereon, which instructions, when executed by one or more processors, cause a gaming system to perform operations comprising:

capturing, via one or more image sensors of a chip tray, image data of a chip stack of gaming chips, wherein the gaming chips are positioned in at least one of a plurality of columns of the chip tray, wherein the one or more image sensors are positioned between at least some of the plurality of columns, and wherein one or more viewing perspectives of the one or more image sensors are aligned substantially parallel to a vertical height of the plurality of columns;

determining, in response to automated analysis of the image data of the chip stack, that the chip stack is taller than half of the vertical height of at least one of the plurality of columns;

segmenting the image data of the chip stack into an upper portion and a lower portion, wherein the upper portion includes image data of chips closest to a top of the at least one of the plurality of columns, and wherein the lower portion includes image data of chips closest to a bottom of the at least one of the plurality of columns;

detecting, via a machine learning model, a value of each chip in the chip stack in response to analysis of chip-edge features of each gaming chip in the chip stack; and electronically animating information in response to detecting the value of each gaming chip in the chip stack.

* * * * *